(12) United States Patent
Miller et al.

(10) Patent No.: US 10,796,386 B1
(45) Date of Patent: *Oct. 6, 2020

(54) LOCATION-CONSCIOUS SOCIAL NETWORKING APPARATUSES, METHODS AND SYSTEMS

(71) Applicant: Miller Nelson, LLC, Richmond, VA (US)

(72) Inventors: Luke Miller, Falls Church, VA (US); Nicolina Miller, Falls Church, VA (US)

(73) Assignee: Miller Nelson, LLC, Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/452,017

(22) Filed: Jun. 25, 2019

Related U.S. Application Data

(63) Continuation of application No. 15/636,583, filed on Jun. 28, 2017, now Pat. No. 10,346,930, which is a continuation of application No. 13/793,139, filed on Mar. 11, 2013, now Pat. No. 9,710,483.

(60) Provisional application No. 61/612,116, filed on Mar. 16, 2012.

(51) Int. Cl.
| | |
|---|---|
| *G06Q 50/00* | (2012.01) |
| *H04L 12/58* | (2006.01) |
| *H04L 29/08* | (2006.01) |
| *G06F 16/9535* | (2019.01) |

(52) U.S. Cl.
CPC ......... *G06Q 50/01* (2013.01); *G06F 16/9535* (2019.01); *H04L 51/32* (2013.01); *H04L 67/18* (2013.01)

(58) Field of Classification Search
CPC ........ G06Q 50/01; G06Q 50/22; H04L 51/32; H04L 67/18; G06F 16/9535
See application file for complete search history.

(56) References Cited

U.S. PATENT DOCUMENTS

| | | |
|---|---|---|
| 7,885,977 B2 | 2/2011 | Baker |
| 8,407,756 B2 | 3/2013 | Morris et al. |
| 8,566,327 B2 | 10/2013 | Carrico et al. |
| 8,606,297 B1 | 12/2013 | Simkhai et al. |
| 9,122,757 B1 | 9/2015 | Wernick et al. |
| 9,733,811 B2 | 8/2017 | Rad et al. |

(Continued)

*Primary Examiner* — Davoud A Zand
(74) *Attorney, Agent, or Firm* — Hanchuk Kheit LLP.; Walter G. Hanchuk

(57) ABSTRACT

The LOCATION-CONSCIOUS SOCIAL NETWORKING APPARATUSES, METHODS, AND SYSTEMS ("LCSN") transforms user personality and location inputs via LCSN components into match and transaction outputs. LSCN may be a processor-implemented method for location-conscious social networking, involving collecting personality details pertaining to a user, analyzing the personality details and constructing a personality profile for the user. The LCSN may also collect geolocation information from the user and compare it to geolocation data from other users, may use user personality profiles to calculate a compatibility rating between the user and other users, and may send an alert to users if the geolocation data indicates that the user is within a specified distance of another user, and/or if the users are matches for each other. Users may further be able to express anonymous interest in other users by anonymously rating potential matches.

23 Claims, 38 Drawing Sheets

(56) References Cited

U.S. PATENT DOCUMENTS

| | | |
|---|---|---|
| 9,959,023 B2 | 5/2018 | Rad et al. |
| 10,203,854 B2 | 2/2019 | Rad et al. |
| 2007/0037574 A1 | 2/2007 | Libov et al. |
| 2008/0052288 A1 | 2/2008 | Flinn et al. |
| 2008/0140650 A1 | 6/2008 | Stackpole |
| 2008/0154899 A1 | 6/2008 | Carmony |
| 2010/0250370 A1 | 9/2010 | Jones et al. |
| 2011/0072470 A1 | 3/2011 | Morris et al. |
| 2011/0087974 A1 | 4/2011 | Kulas |
| 2012/0143779 A1 | 6/2012 | Chang |
| 2012/0246231 A1 | 9/2012 | Norena |
| 2012/0290977 A1 | 11/2012 | Devecka |
| 2012/0294495 A1 | 11/2012 | Wren |
| 2013/0047115 A1 | 2/2013 | Migos |
| 2013/0122936 A1* | 5/2013 | Hudson .................. H04W 4/21 455/456.3 |
| 2013/0169683 A1 | 7/2013 | Perez |
| 2013/0226628 A1 | 8/2013 | Scher |
| 2015/0178994 A1 | 6/2015 | Bailey |

* cited by examiner

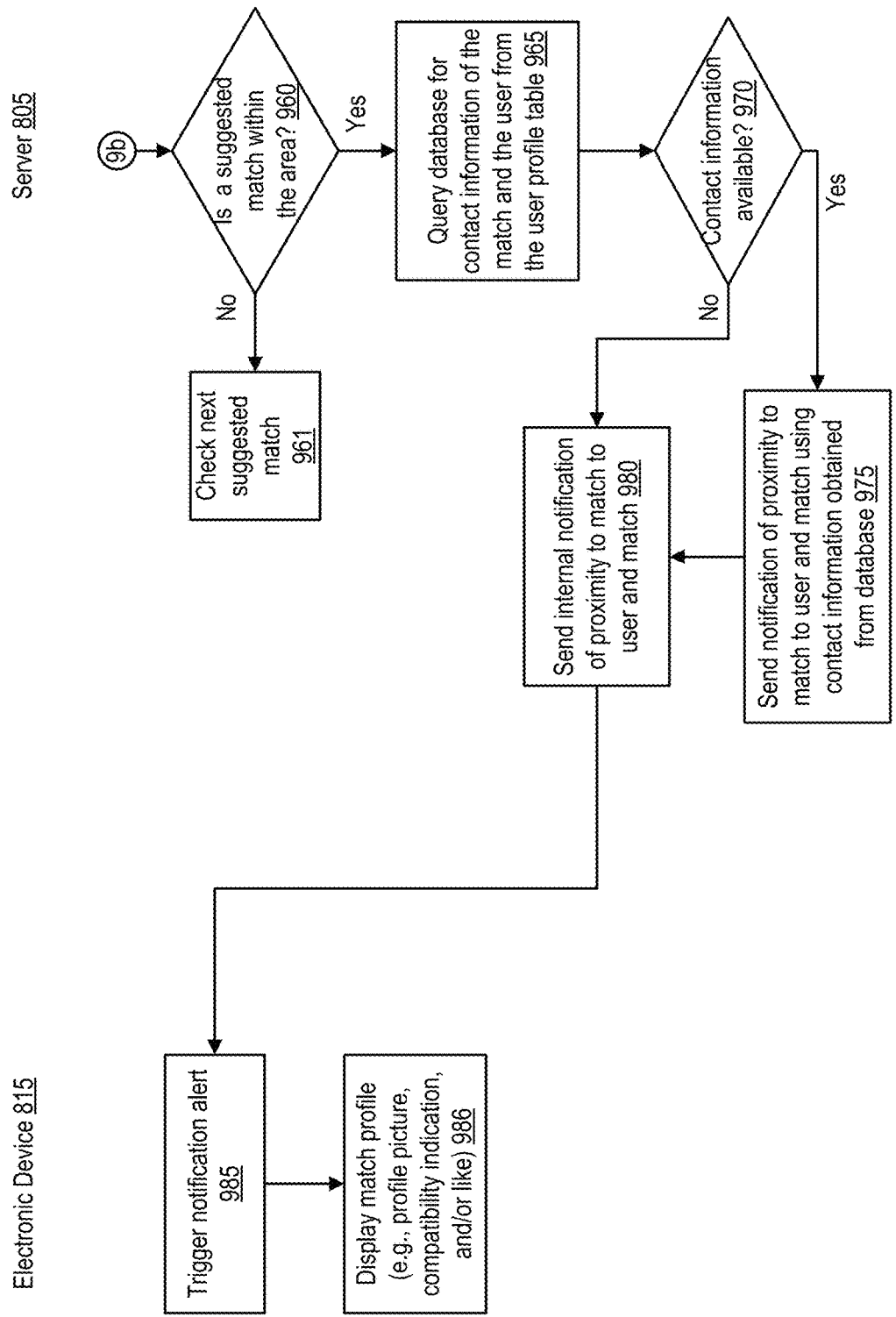

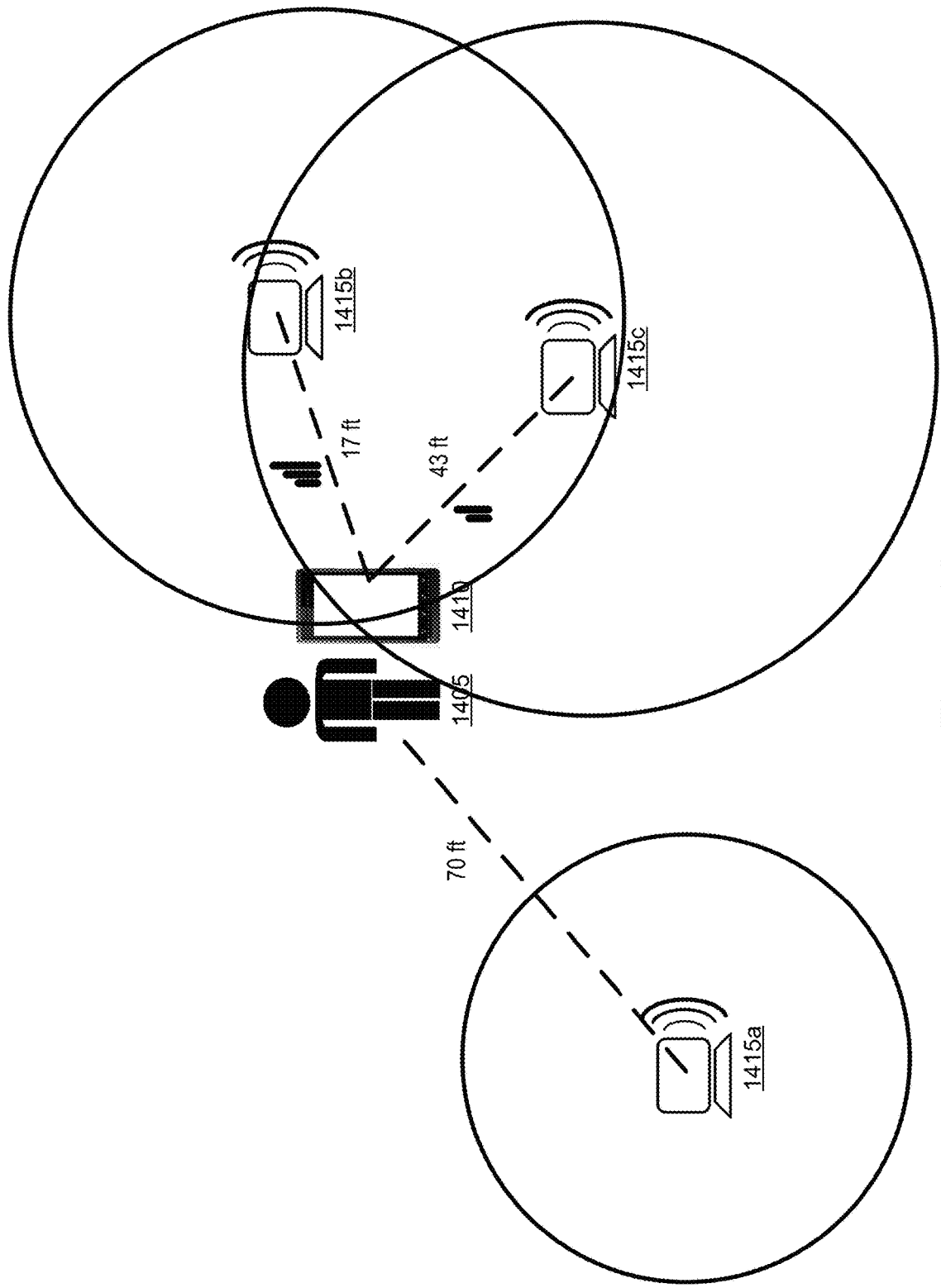

LOCATION-CONSCIOUS SOCIAL NETWORKING APPARATUSES, METHODS AND SYSTEMS

PRIORITY CLAIM

Applicant hereby claims benefit to priority under 35 USC § 120 as a continuation of U.S. patent application Ser. No. 15/636,583, filed Jun. 28, 2017, entitled "LOCATION-CONSCIOUS SOCIAL NETWORKING APPARATUSES, METHODS AND SYSTEMS"; which in turn claims benefit to priority under 35 USC § 120 as a continuation of U.S. patent application Ser. No. 13/793,139, filed Mar. 11, 2013, entitled "LOCATION-CONSCIOUS SOCIAL NETWORKING APPARATUSES, METHODS AND SYSTEMS"; which in turn claims benefit to priority under 35 USC § 119 as a non-provisional conversions of: U.S. provisional patent application Ser. No. 61/612,116, filed Mar. 16, 2012, entitled a "LOCATION-CONSCIOUS SOCIAL NETWORKING APPARATUSES, METHODS AND SYSTEMS."

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

The entire contents of the aforementioned application are herein expressly incorporated by reference.

BACKGROUND

Computers are used in a number of different contexts for a variety of different purposes. A user may interact with a computer to connect to the Internet, which may allow the user to complete a number of different tasks via websites, such as social networking websites. The user may also interact with a mobile device in order to interact with such websites, and may interact with such websites for the purpose of interacting with other users on the same website.

BRIEF DESCRIPTION OF THE DRAWINGS

The accompanying appendices and/or drawings illustrate various non-limiting, example, innovative aspects in accordance with the present descriptions:

FIGS. 9a-c show logic flow diagrams illustrating finding nearby potential matches in some embodiments of the LCSN;

FIGS. 14a-b show block diagrams illustrating determining location with Wi-Fi signals in some embodiments of the LCSN;

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

This disclosure describes apparatuses, methods and systems for a LCSN. It is to be understood that, depending on the particular needs and/or characteristics of a LCSN user, mobile device, message, score, transaction, merchant, data transmission and/or network framework and/or the like, various embodiments of the LCSN may be implemented that enable a great deal of flexibility and customization. The instant disclosure discusses embodiments and/or applications of the LCSN directed to a dating platform; however, it is to be understood that the apparatuses, methods and systems discussed herein may be readily adapted and/or reconfigured for a wide variety of other applications and/or implementations. For example, aspects of the LCSN may be adapted for location-based social networking, professional networking at conferences and/or other professional events, and/or the like. Furthermore, aspects of the LCSN may be configured to generate, administer and/or manage a wide variety of forms of user data, geolocation data, image data, message data and/or the like beyond specific embodiments and/or implementations described herein. It is to be understood that the LCSN may be further adapted to other implementations and/or applications.

LCSN

Figure 1:
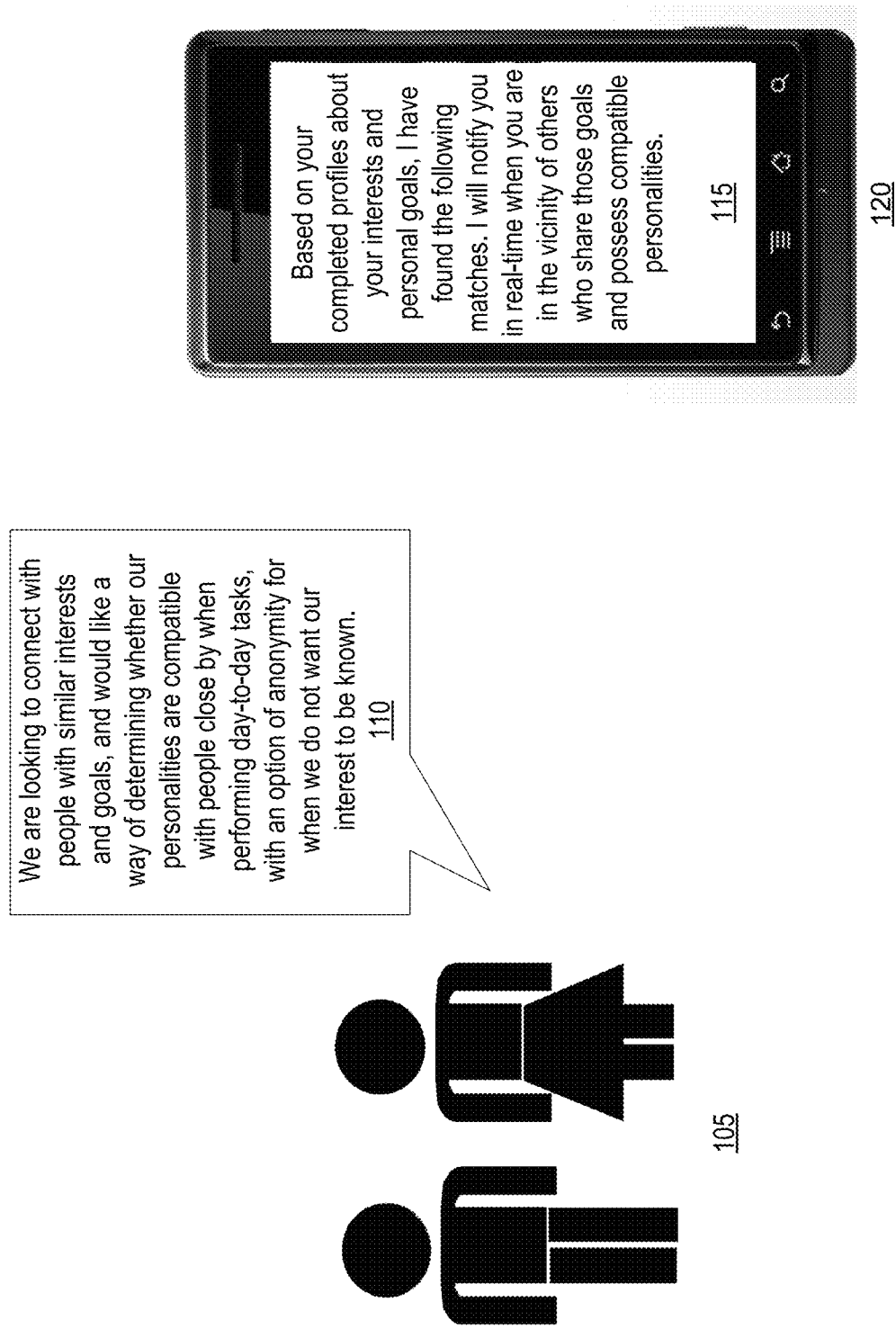
FIG. 1 shows a schematic block diagram illustrating some embodiments of the LOCATION-CONSCIOUS SOCIAL NETWORKING APPARATUSES, METHODS, AND SYSTEMS (hereinafter "LCSN")

FIG. 1 shows a schematic block diagram illustrating some embodiments of the LCSN. In some implementations, users 105 may sign up for an account on the LCSN, having a mutual interest to connect with people with similar interests and relationship goals 110. In some implementations, users may be looking for friends, networking connections, dating partners, contractors, future project partners, and/or the like. In some implementations, the users may complete a profile, which may include biographical information, user interests, and/or the like, in order to find common interests with other users with like relationship goals. In some implementations, the users may be able to use a mobile device 120 to create the profile and to search the LCSN for potential matches. In some implementations, the LCSN may send the users potential matches based on their proximity, compatibility, past history on the LCSN, available status, and/or the like, and may send updates to the user in real-time whenever a potential match is in close proximity to the user 115.

Figure 2:
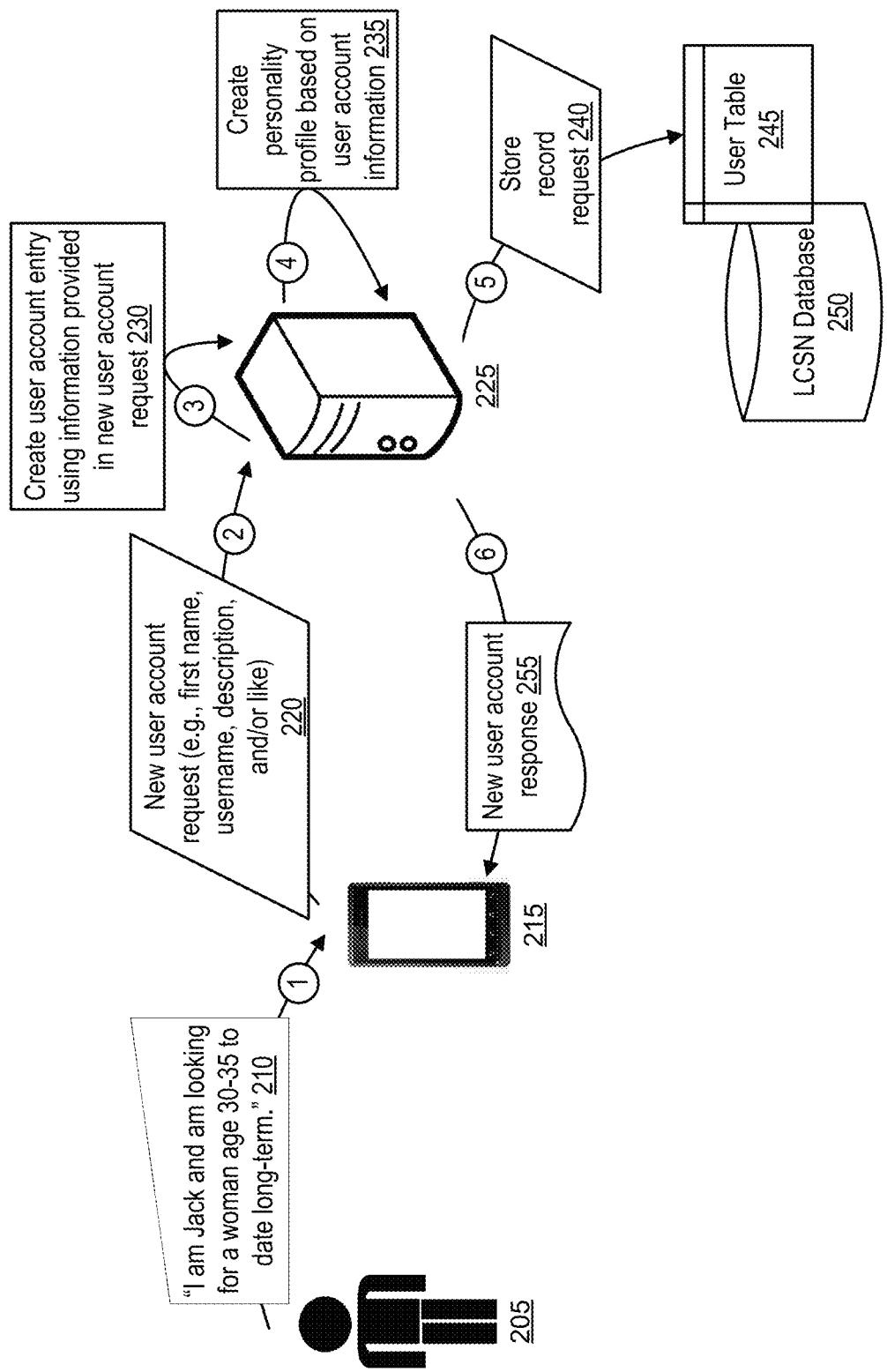
FIG. 2 shows a data flow diagram illustrating creating a user account in some embodiments of the LCSN.

FIG. 2 shows a data flow diagram illustrating creating a user account in some embodiments of the LCSN. In some embodiments, the user 205 may create an account by providing profile information 210 to the LCSN via an electronic device 215. In some implementations, the profile information may comprise the user's biographical information, such as the user's name, age, sex, the types of relationships the user is looking for, where the user lives, the education level of the user, the occupation of the user, a user name, a user biography, and/or the like. In some implementations, the user may enter the profile information by choosing an information category 1705 from a list of possible information that may be provided in the user profile 1720, and entering in the information 1710 relevant to the category. In some implementations, the user may be able to mark certain categories as private 1715; in some implementations, private information may not be seen by other users.

In some implementations, users may use electronic devices such as personal computers and/or mobile devices, including mobile phones, tablets, and/or the like. In some implementations, the electronic device may be powered by an internal battery powered by solar energy, chemical energy, kinetic energy, and/or the like, or may otherwise be powered by a plurality of energy sources capable of generating electrical power to a device. In some implementations, the electronic device may send the information as a new user account request 220 to the LCSN server 225. In some implementations, an exemplary XML-encoded user account request may take a form similar to the following:
POST/newuseraccountrequest.php HTTP/1.1
Host: www.LCSNproccess.com
Content-Type: Application/XML
Content-Length: 788
<?XML version="1.0" encoding="UTF-8" ?>
<newUserAccount_request>
<timestamp>2016-01-01 12:30:00</timestamp>
  <user_params>
    <user_bio>I am Jack and am looking for a woman age 30-35 to date long-term.</user_bio>
    <user_screenname>username123</user_screenname>
    <user_first_name>Jack</user_first_name>
    <user_last_name>Smith</user_last_name>
    <user_age>33</user_age>
    <user_birthday>1979-01-01</user_birthday>
    <user_occupation>Doctor</user_occupation>
    <user_joined>2016-01-01 12:30:00</user_joined>
    <user_location>New York, N.Y.</user_location>
    <action>new_user</action>
  </user_params>
</newUserAccount_request>

In some implementations, the server may create a new user account entry in the LCSN database 250, using the information provided in the new user account request. In some implementations, an exemplary XML-encoded user account entry may take a form similar to the following:
<user>
  <user_bio>I am Jack and am looking for a woman age 30-35 to date long-term. </user_bio>
  <user_screenname>username123</user_screenname>
  <user_first_name>Jack </user_first_name>
  <user_last_name>Smith </user_last_name>
  <user_age>33</user_age>
  <user_birthday>1979-01-01</user_birthday>
  <user_occupation>Doctor </user_occupation>
  <user_address>123 5th Avenue, New York, N.Y. 10112</user_address>
  <user_financial_data></user_financial_data>
  <user_matches>00112233445566 777888999000111</user_matches>
  <user_favorites>224444666666</user_favorites>
  <user_joined>2016-01-01 12:30:00</user_joined>
  <user_location>New York, N.Y. </user_location>
  <user_id>1234567890864213579</user_id>
</user>

The LCSN may also generate a personality profile 235 that is linked to the user account, based on the user account information provided. In some implementations, the personality profile may include a set of keywords that describe the user's personality, which are obtained by the profile information provided by the user, along with any other information provided to the LCSN by the user. In some implementations, an exemplary XML-encoded personality profile entry may take a form similar to the following:
<personality>
  <personality_id>893384945928340282</personality_id>
  <personality_type>ISTP </personality_type>
  <personality_habit>messy, sedentary </personality_habit>
  <personality_hobby>cook, eat, watch movies, watch sports, baseball, football </user_last_name>
  <personality_trait>trustworthy, intelligent, loyal </personality_trait>
  <user_id>1234567890864213579</user_id>
  <personality_updated>1979-01-01</personality_updated></personality>

Both the user account and the personality profile may be stored via a store record request 240 to the LCSN database 250, which may invoke the database to store the personality and user profile information in a user table 245. The user may be sent a response 255 indicating that the new account has been successfully created.

Figure 3:
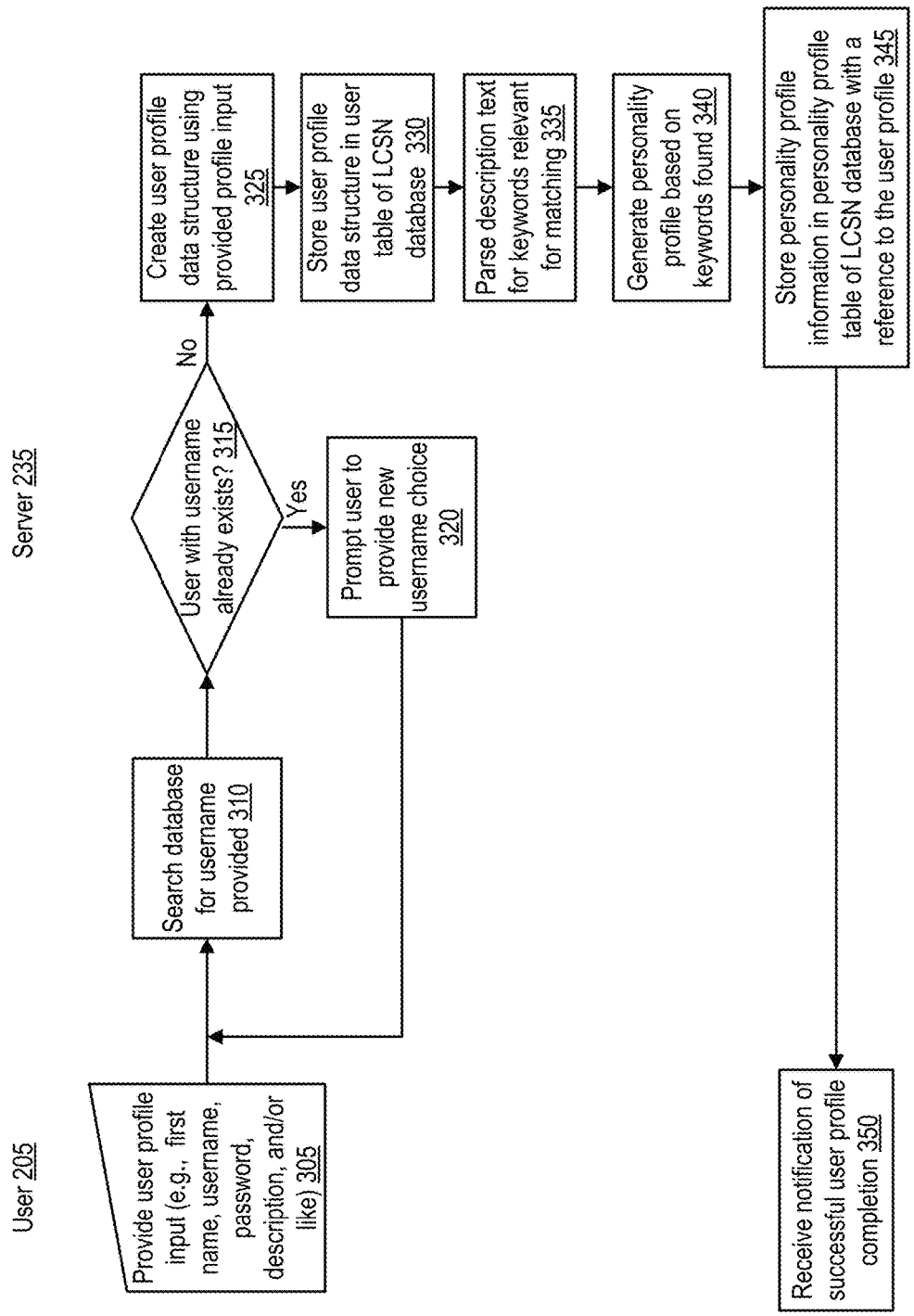
FIG. 3 shows a logic flow diagram illustrating creating a user account in some embodiments of the LCSN.

FIG. 3 shows a logic flow diagram illustrating creating a user account in some embodiments of the LCSN. In some implementations, the user 205 may provide user profile input 305, which may involve providing information such as the user's name, username, password, biography, privacy level (e.g., whether the user's entire profile is public or private, whether only interests are public and all other information is private, whether, by default, any indications of interest in other users are anonymous to the involved parties, and/or the like), and/or the like. In some implementations, the user may also specify the user's availability status 1505 (e.g., whether the user is actively looking for other users to connect with, whether the user is casually looking for or open to finding others to connect with, whether the user is not currently interested in connecting with others, and/or the like). The server 235 may check the database 310 to make sure the username provided by the user is not already in use by another user 315. If the username is already in use, the LCSN may prompt the user to provide a new username 320. Once the user has provided a new username, the server may create a user profile data structure using the provided user profile input 325, and may store the user profile data structure in the user profile table of the LCSN database 330. The server may then parse the text of the biography and/or other parts of the profile input in order to obtain keywords relevant for matching the user with other users in the LCSN system 335. The server may generate a personality profile based on the keywords obtained from the profile input 340, and may also store the personality profile as a data structure in a personality profile table of the LCSN database, with a reference to the user profile 345. In some implementations, the personality profile may also be a field in the user profile data structure, and therefore may be saved in the user profile table with the user profile data structure, rather than in a personality profile table. The LCSN may then send a notification to the user, which may notify the user that the user profile has been successfully completed 350.

Figure 4:
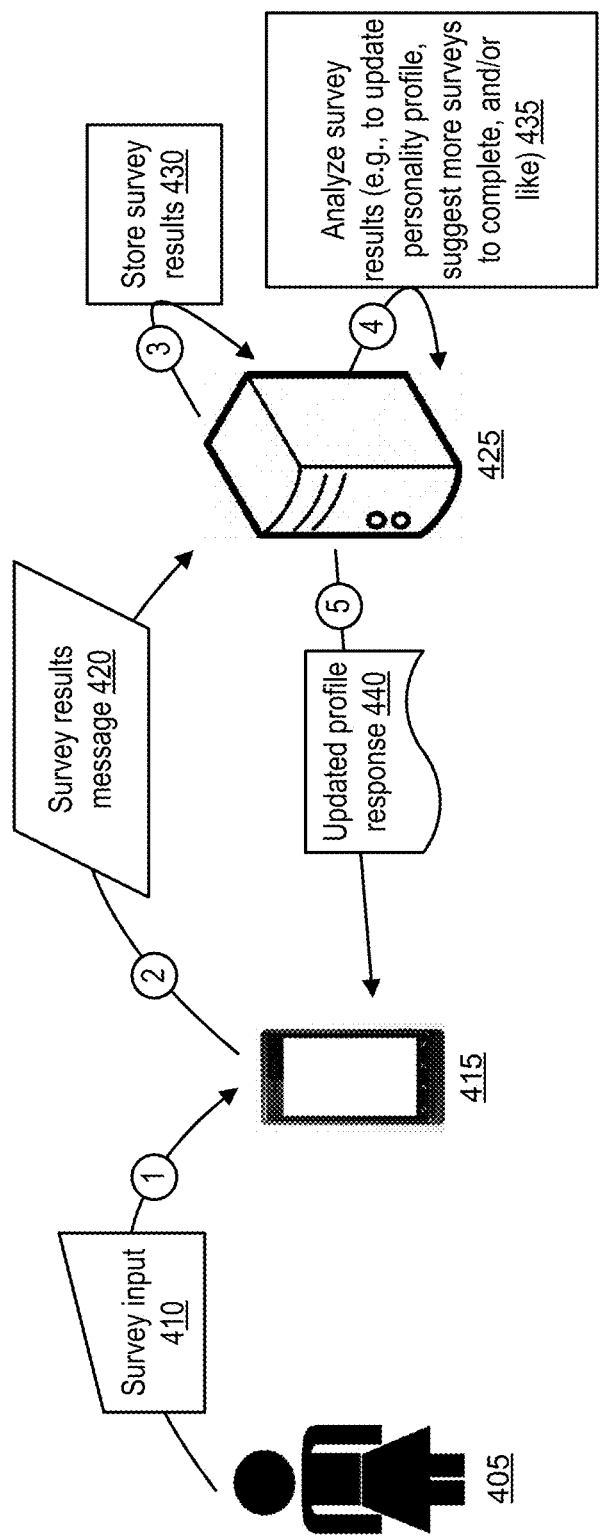
FIG. 4 shows a data flow diagram illustrating completing a survey in some embodiments of the LCSN.

FIG. 4 shows a data flow diagram illustrating completing a survey in some embodiments of the LCSN. In some implementations, after creating a profile, the user 405 may be able to answer survey questions, or otherwise indicate the user's interests and personality traits in order to facilitate better user matching. In some implementations, the user may be prompted to fill out a minimum amount of information before receiving matches; in other implementations, the user may be able to provide as much or as little information as the user wants, and may be able to receive matches regardless of how much information has been provided, based on the user's geographical location, based on the information provided by the user to the LCSN, and/or the like. In some implementations, surveys may include personality quizzes and/or the like. In some implementations, the surveys may be pre-populated on the LCSN; in other implementations, users may also be able to submit their own surveys for other users to complete. The user's answers may be provided as survey input 410 to an electronic device 415, which may then send the answers in a survey results message 420 to the LCSN server 425. In some implementations, an exemplary XML-encoded survey results message may take a form similar to the following:
POST/surveyresultsrequest.php HTTP/1.1
Host: www.LCSNproccess.com
Content-Type: Application/XML
Content-Length: 788
<?XML version="1.0" encoding="UTF-8" ?>
<surveyResults_request>
<timestamp>2016-01-01 12:30:00</timestamp>
  
  <user_id>1234567890864213579</user_id>
  <survey_id>874627863847697854687</survey_id>
  a a a b b c a d d b a
  <action>new_results</action>
  
</surveyResults_request>

The system may store the survey results 430 as a data structure in the LCSN database. In some implementations, an exemplary XML-encoded survey results data structure may take a form similar to the following:

<user_id>1234567890864213579</user_id>
  <survey_id>874627863847697854687</survey_id>
  a a a b b c a d d b a
  98379826789076876

The server may then analyze the survey results 435 in order to update the user's personality profile, in order to suggest more surveys for the user to complete, and/or the like. In some implementations, the LCSN may use metadata associated with the survey in order to determine how to interpret a user's answers. For example, if the user completes a multiple-choice survey, the survey may be associated with metadata that specifies what type of personality traits each multiple choice answer corresponds to. In other implementations, the LCSN may use natural language processing to process the user's answers and what personality trait keywords to add to the user's personality profile, and/or the like. The LCSN may then send the user an updated profile page 440 in order to confirm that the user's answers have been properly recorded and applied to the user's profile.

In some implementations, the user may also be able to add interests and other information by selecting categories 1620 to add information about. In some implementations, the user may select a category 1605, and may view all the items related to the category 1610 that the user has already entered via surveys or via the add interest section 1625. The user may be able to add and/or delete entries in each category, as well as assign an opinion to each entry 1615 (e.g., liking the entry, strongly disliking the entry, and/or the like). In some implementations, the opinion provided serves as a way of fine-tuning compatibility ratings with other users (see at least FIGS. 6-7a). In some implementations, the LCSN may recognize some entries as being broad entries 1630, which may allow a user to expand the entry in order to provide further details 1635 pertaining to the entry. For example, if a user indicates in a category labeled "Sports" that the user likes "baseball," the LCSN may recognize that the sport baseball may have a plurality of teams, and may allow the user to specify which teams the user likes and dislikes in baseball. In some implementations, the LCSN may store knowledge about certain interests in order to know whether an entry is a broad entry; in other implementations, the LCSN may use machine learning components to process the user's entries in order to determine whether any further detail is applicable.

Figure 5A:
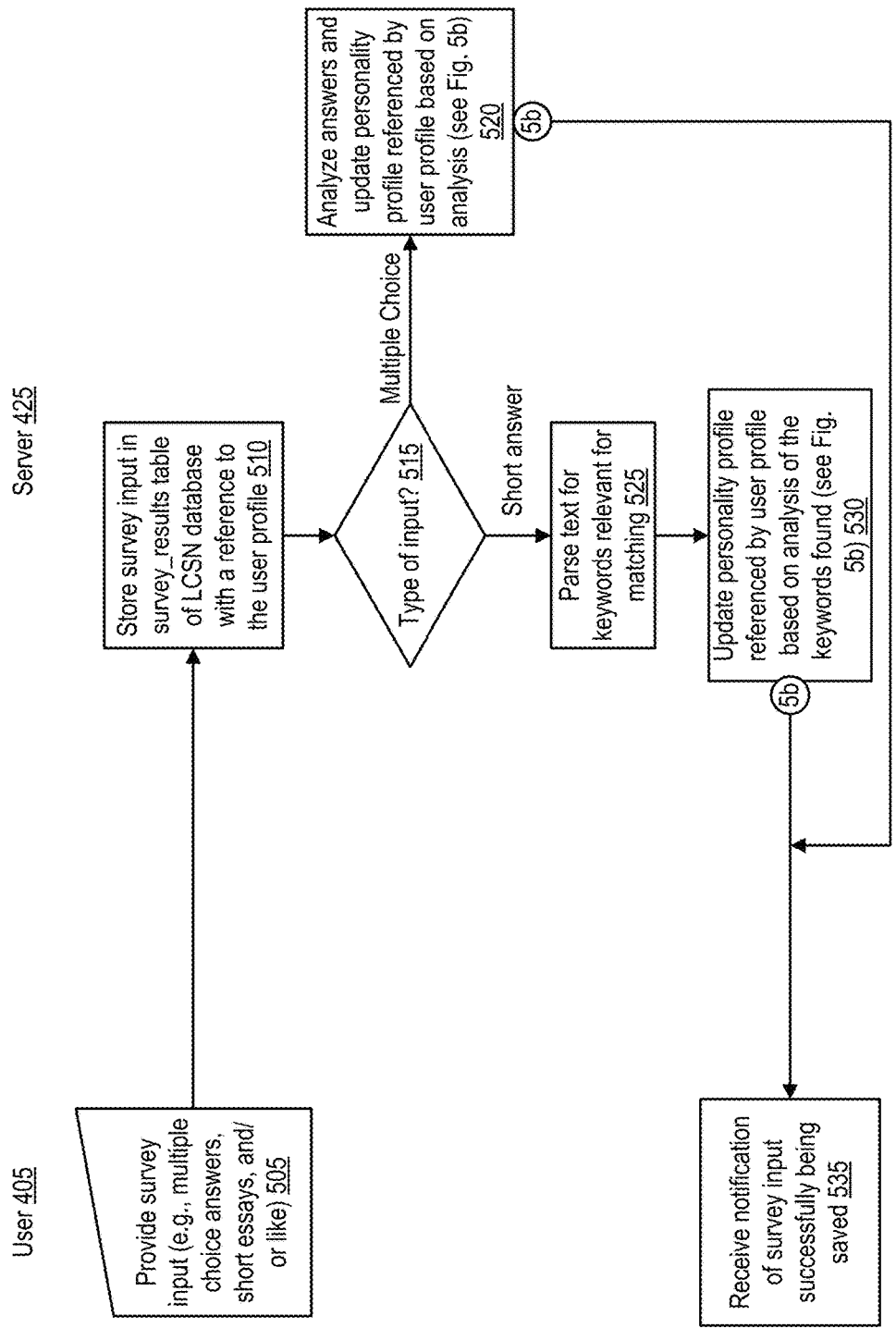
FIGS. 5a-b show logic flow diagrams illustrating completing a survey in some embodiments of the LCSN.
Figure 5B:
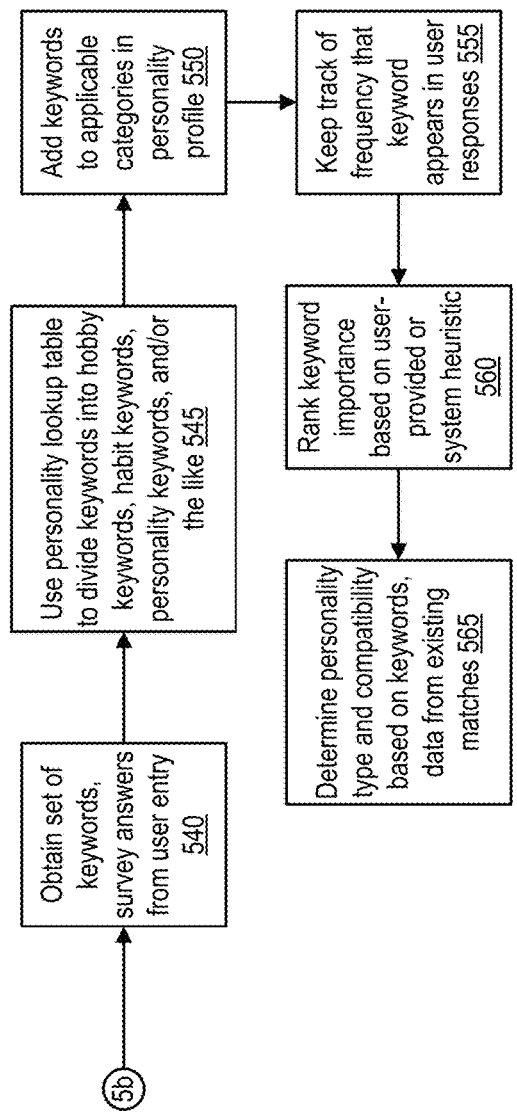

FIGS. 5a-b show logic flow diagrams illustrating completing a survey in some embodiments of the LCSN. In some implementations, the user 405 may provide survey input 505, which may comprise multiple choice answers, short essays, and/or the like. The server 425 may store the survey input in the survey_results table in the LCSN database, and may add as a field a reference to the user profile associated with the user 510. The server may also determine what type of input has been provided 515. If the user provided multiple choice answers to the survey, the server may analyze the answers via the survey metadata and/or the like, and then may update the user's personality profile based on the conclusions made by processing the survey answers 520. If the user provided a short essay or similar textual answer, the server may parse the text for keywords relevant to building the user's personality profile 525, and may then update the personality profile using the keywords found, as well as based on any other form of analysis performed on the text 530. In some implementations, the LCSN may use a natural language processing component to extract details from the user's answers and determine personality traits from the text. For example, the component may analyze not only the content of the response, but the type of vocabulary used, the syntax used, the sophistication of the response, and/or the like in order to determine personality traits associated with the user.

In some implementations, the personality profile may be created by obtaining the keywords and other parsed information from the user entry 540, followed by using a lookup table containing categories of keywords (e.g., hobby keywords, habit keywords, personality keywords, business objectives keywords, and/or the like) in order to classify the information obtained from the user entry 545. For example, if the server receives the phrase "play sports," the server may classify the phrase as a "hobby_keyword" and add it to the hobby category accordingly 550; the system may also add personality traits to the personality profile that include "athletic," "fit," "active," and/or like traits, based on the context of the keyword. The system may also keep track of statistics, including how often a particular term or phrase has occurred in a user response, and/or the like 555. These statistics may then be used in order to rank keywords in order of importance (for example, keywords may be ranked based on how frequently they appear in user responses, and/or the like) 560. In some implementations, the LCSN may also be able to use a machine learning component to determine relationships between keywords in order to determine overarching personality types (for example, if a user has the keywords "creative," "open," "curious," and "artsy," the system may be able to label the user as a "Type B Personality," and/or make a like prediction of the user's personality 565. In some implementations, the system may also predict other personality types, such as Enneagram and Myers-Briggs personality types, and/or the like. The system may also compare the personality type and keywords generated for the personality profile to those of other users, in order to gauge compatibility between the two parties.

The user may then receive a notification informing them that the survey input was successfully processed and saved 535. In some implementations, user actions throughout the LCSN may be used to refine the personality profile for the user. For example, rejecting specific groups of people (e.g., people who are older, from a particular occupation, and/or the like) consistently may allow the LCSN to update the user's personality profile to reflect a distaste for qualities common in the groups of people who are rejected.

Figure 6:
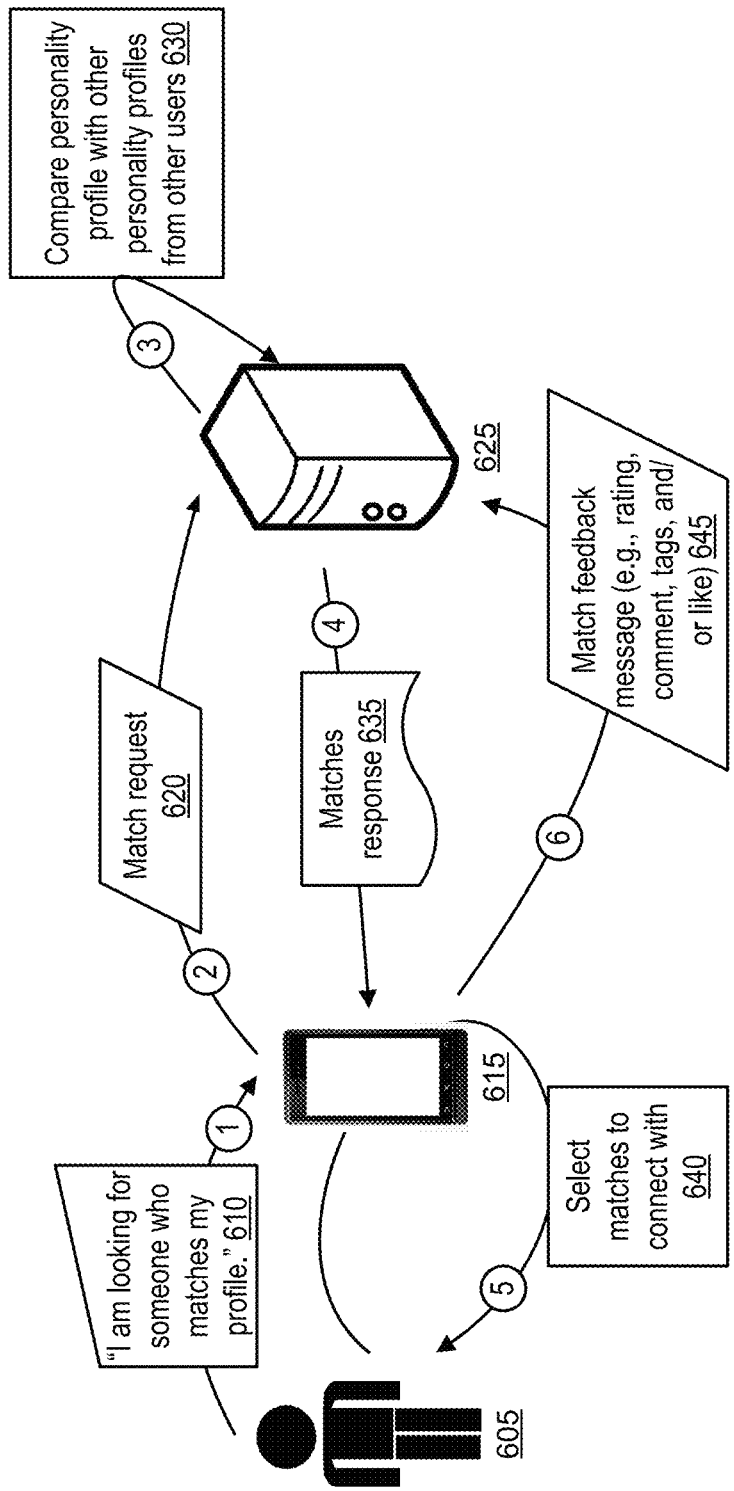
FIG. 6 shows a data flow diagram illustrating searching for potential matches in some embodiments of the LCSN.

FIG. 6 shows a data flow diagram illustrating searching for potential matches in some embodiments of the LCSN. In some implementations, a user 605 may request a list of suggested matches 610 via an electronic device 615. In some implementations, the user may specify criteria for searching for potential matches, including proximity to the user, an age range, a sex, a level of education, a religion, and/or the like. In some implementations, the user may automatically be sent a list of potential matches whenever the user accesses his profile, based on the user's geolocation data.

The electronic device may send the request as a suggested match request 620 to the LCSN server 625. In some implementations, an exemplary XML-encoded suggested match request may take a form similar to the following:
POST/matchrequest.php HTTP/1.1
Host: www.LCSNproccess.com
Content-Type: Application/XML
Content-Length: 788
<?XML version="1.0" encoding="UTF-8" ?>
<match_request>
<timestamp>2016-01-01 12:30:00</timestamp>
  <match_params>
  <user_id>1234567890864213579</user_id>
  <action>find_matches</action>
  </match_params>
</match_request>

The server may then retrieve the personality profile of the user, and compare it with that of other users 630. It may then send all queried users fitting the criteria as a suggested match response 635, which may include information about each suggested match. In some implementations, only users who have indicated that they want their profiles to be public may be included in the suggested match response. In some implementations, only users within a specified geographic region may be added to the list of suggested matches. In some implementations, the region may be specified by the user's location data and/or specifications manually entered by the user. The user may be able to select users to connect with 640 by rating the suggested matches and/or sending some of the suggested matches messages indicating interest within the LCSN (see FIG. 10). The feedback provided by the user may be sent to the server in a match feedback message 645, which may be processed by the server for information to be stored in the LCSN database.

Figure 15A:
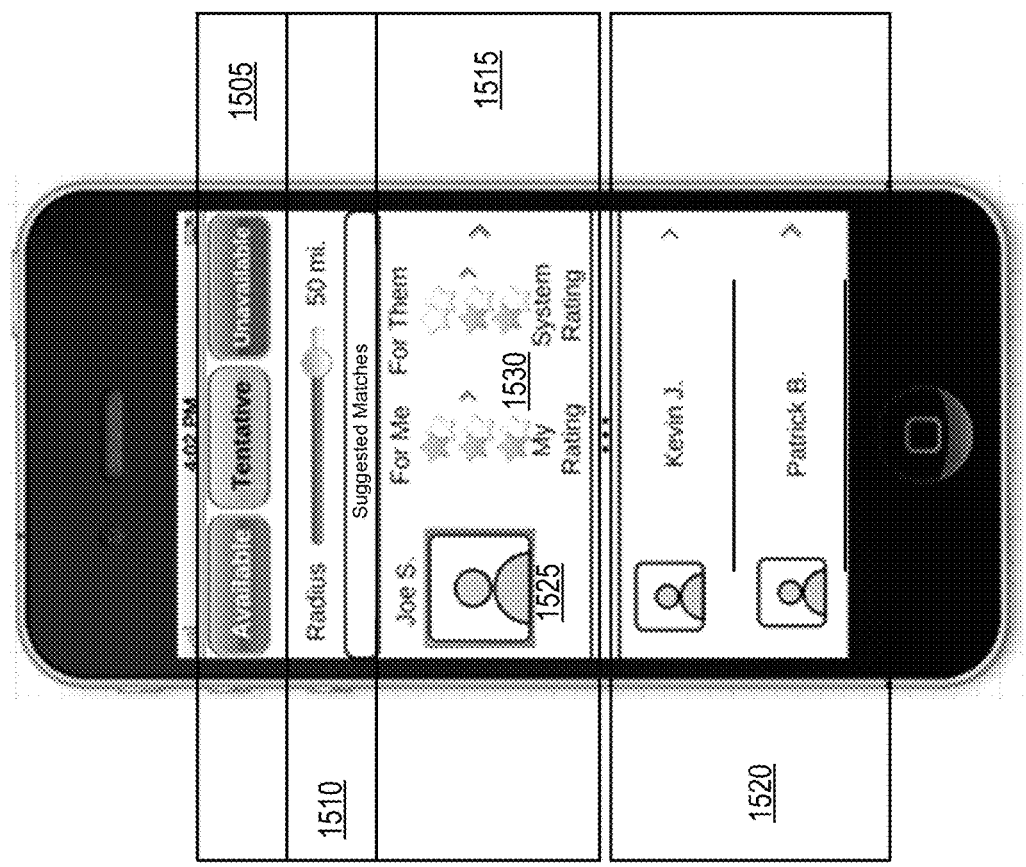
FIGS. 15a-b shows a screenshot diagram illustrating viewing suggested matches in some embodiments of the LCSN.
Figure 15B:
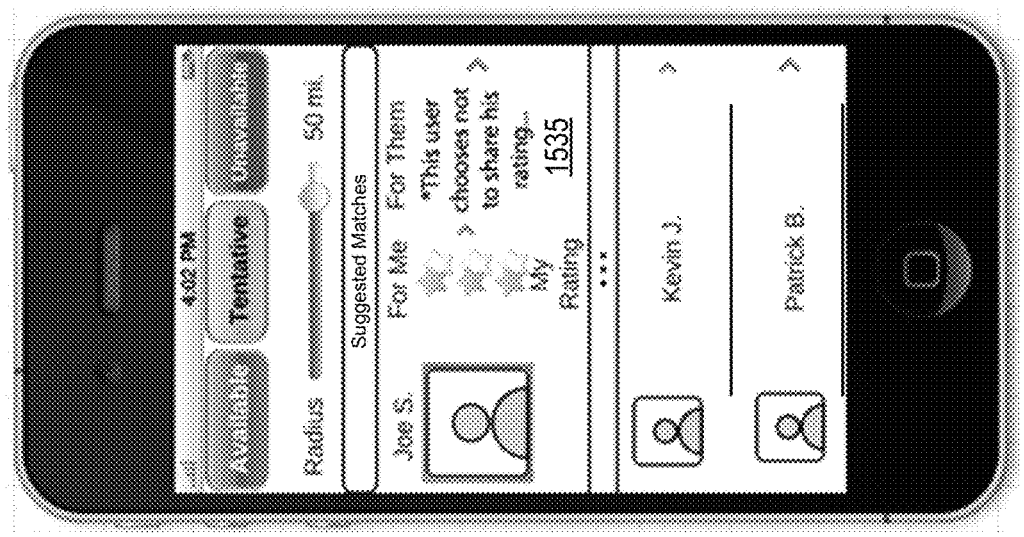
Figure 16A:
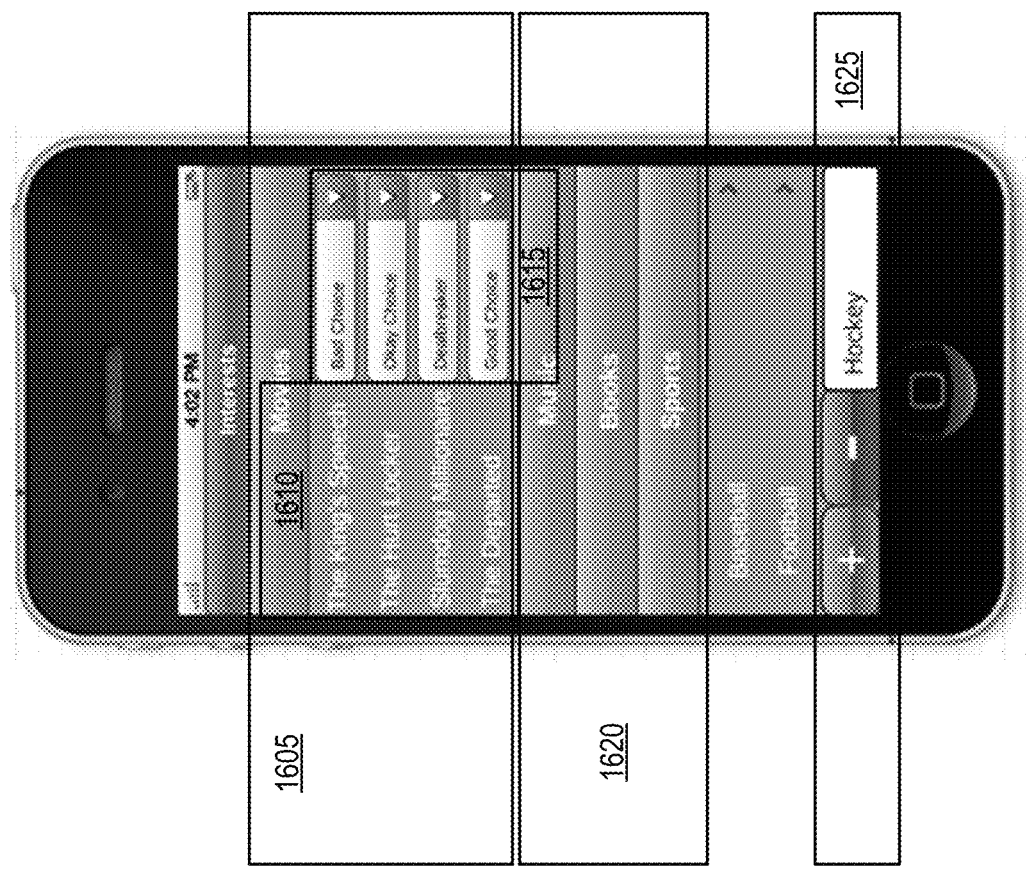
FIGS. 16a-b shows a screenshot diagram illustrating providing interests in some embodiments of the LCSN.
Figure 16B:
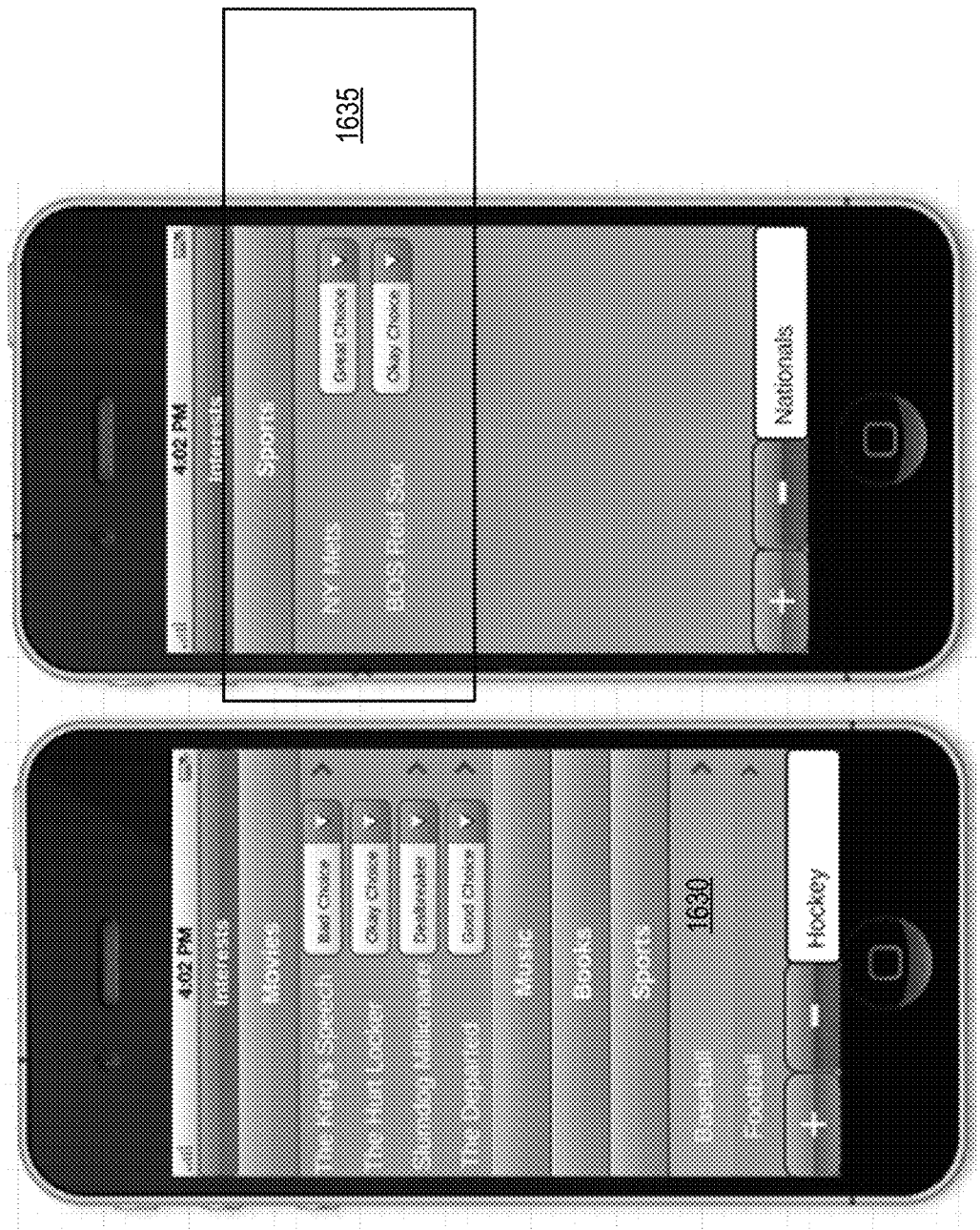
Figure 17:
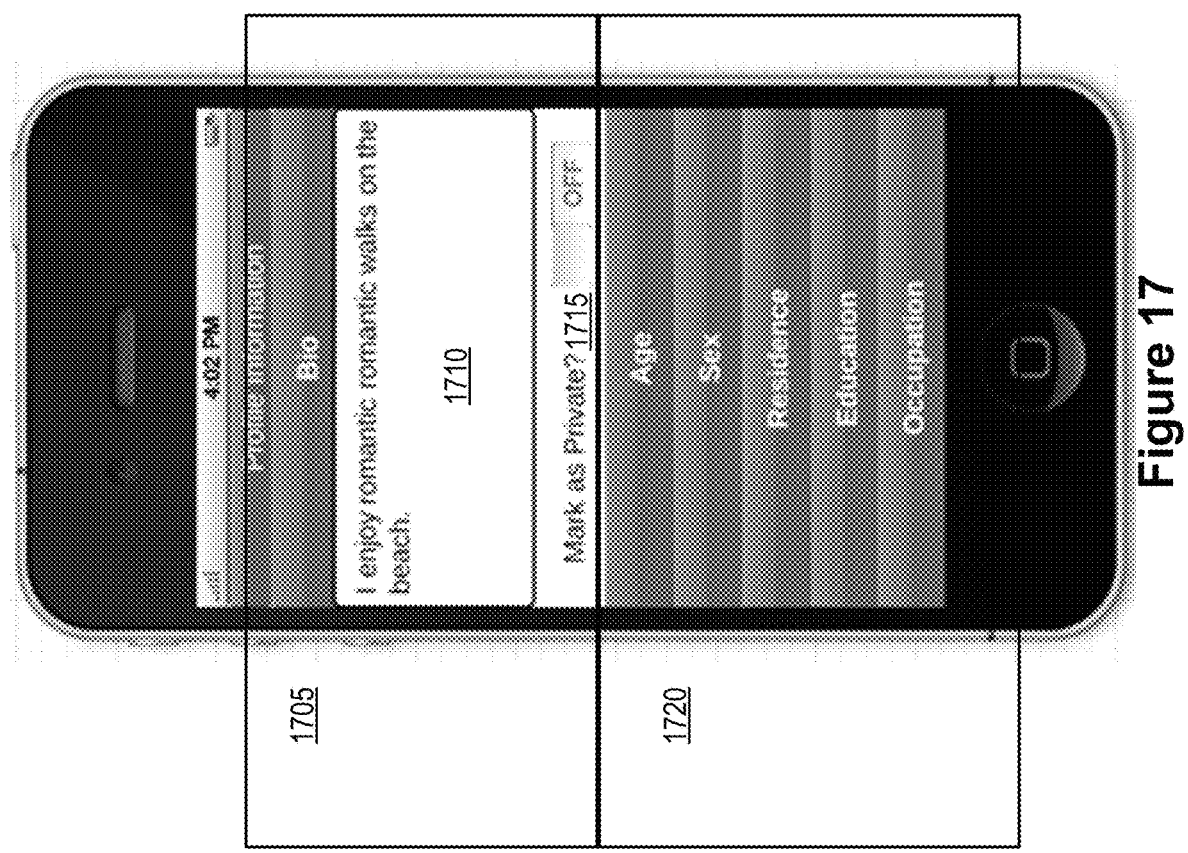
FIG. 17 shows a screenshot diagram illustrating user profiles in some embodiments of the LCSN.

In some implementations, the user may view potential matches via an interface resembling FIGS. 15a-b. The user may be able to see profile information for the suggested match 1515, including a profile picture 1525 and any ratings 1530 associated with the suggested match, any public ratings the suggested match has of the user, and/or the like. In some implementations, the user may set his rating of a particular suggested match as private (or vice-versa) 1535. The user may also be able to expand the profile in order to view more information about the suggested match's likes and dislikes, and may be able to determine the suggested match's availability based on the color of the border around the suggested match's profile picture. In other implementations, a color-coded icon may appear that indicates the suggested match's status. The user may also see a list of other suggested matches 1520 for the user, and may be able to click on the other suggested matches in order to view their profiles.

Figure 7A:
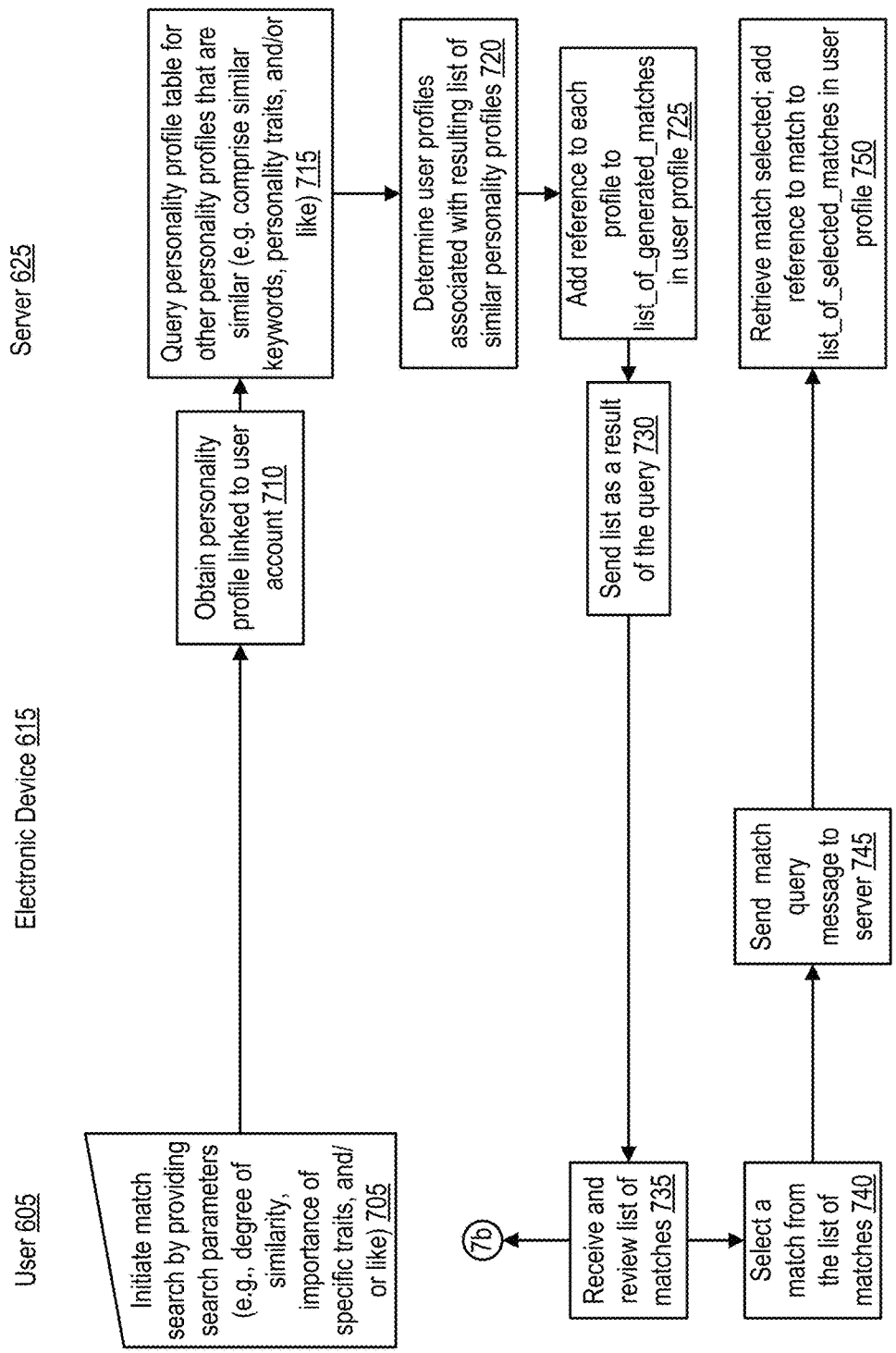
FIGS. 7a-c show logic flow diagrams illustrating searching for potential matches in some embodiments of the LCSN.
Figure 7B:
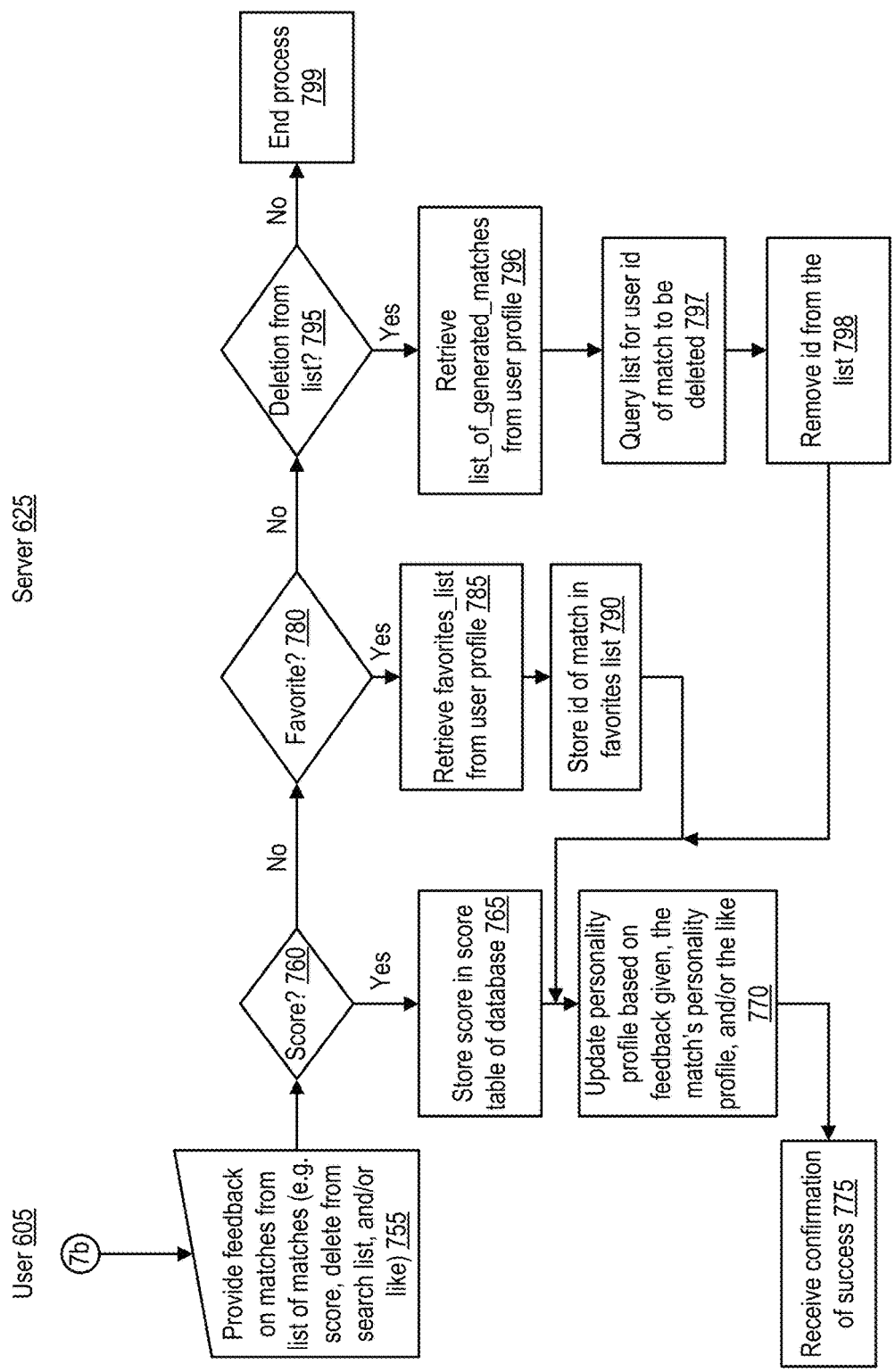
Figure 7C:
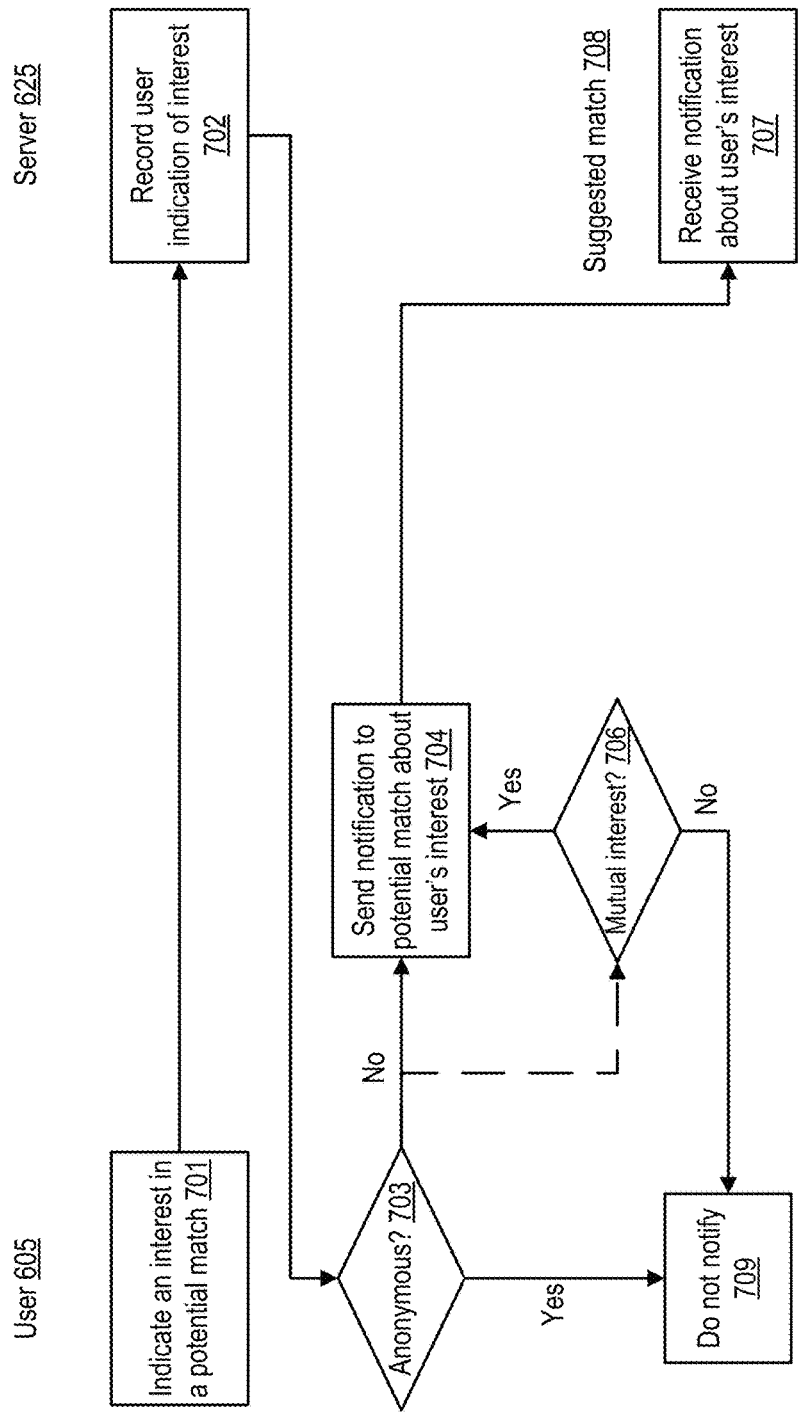

FIGS. 7a-c show logic flow diagrams illustrating searching for potential matches in some embodiments of the LCSN. In some implementations, the user 605 may initiate a search for a potential match by providing search parameters, such as the degree of similarity the user wants potential matches to have to the user's profile, the importance of specific traits (including age, sex, education level, personality type, and/or the like), and/or the like 705. If the user searches using personality and/or biographical parameters, the server 625 may obtain the personality profile linked to the user 710, and may query the personality profile table in order to find other personality profiles that match the user's specifications 715. In some implementations, the LCSN may also automatically generate a geographic region to search within, based on the user's location data. In some implementations, the LCSN may use the search parameters to limit what parts of the personality profile to compare. In some implementations, general compatibility may be calculated based on similarities between the user's likes, dislikes, and/or the like, and may also involve adding a weight to the compatibility score based on the importance the user has attributed to particular likes, dislikes, and/or the like. For example, a positive weight may be added to the compatibility rating if the user specifies that liking the New York Giants is an important quality in a match, and the personality profile of a potential match specifies that the match likes the New York Giants; if, however, the user specifies that liking the Boston Red Sox is a "deal-breaker," then a negative weight may be added to the compatibility rating if the match's personality profile indicates that the match likes the Boston Red Sox. If the user searches by location, LCSN may search the user database for users within a specified area. In some implementations, the user may specify the region via zip code, city, via drawing an area on a map provided by the LCSN, and/or the like. In some implementations, the LCSN may also automatically generate a geographic region to search within, based on the user's location data.

Once the LCSN has found at least one user with a high compatibility rating matching the user's specifications (in some implementations, based on the personality profiles 720), the LCSN may add a reference to the user profile to a list of suggested matches stored as a field in the user's profile data structure 725. In some implementations, only users who have specified that their profiles are public may be added to the stored list of suggested matches. In some implementations, the LCSN may scan all available users for potential matches; in other implementations, the LCSN may instead compare users until a specified threshold has been reached (e.g., until 20 matches have been found). Once the list of suggested matches has been generated, the server may send the list as a result of the query to the user who initiated the suggested match request 730, who may receive and review the list of suggested matches 735. In some implementations, if the user received a limited number of suggested matches, the user may be able to request a new list of suggested matches after receiving the result of the query. The server may then create a new list of suggested matches that differ from the list currently in the user profile, and may then erase the list of suggested matches contained in the user profile data structure and replace them with the new list. In some implementations, if a user is added as a suggested match for the user, then the suggested match may also have the user added as a suggested match on the suggested match's suggested match list. In other implementations, the user may not be automatically added to the suggested match lists of the people on the user's suggested match list.

In some implementations, the LCSN may provide a compatibility score to the user in the form of a percentage of compatibility, based on a calculation taking into account the raw compatibility score, as well as the weights based on importance of liking or disliking certain qualities or things, and/or a like calculation. In some implementations, the LCSN may provide the compatibility score by generating an n-star rating (e.g., a three-star rating) for the suggested match, that may be viewed whenever the user views the suggested match.

If the user sees a suggested match that he likes 708, the user may be able to select the suggested match from the list 740, for the purpose of sending the suggested match a notification 704 indicating that the user is interested in connecting with the suggested match 701, and/or the like. In some implementations, the user may also anonymously indicate interest in the suggested match 703, which may not prompt the LCSN to send the suggested match a notification. The mobile device 615 may then send a suggested match query message to the server 745, which may contain information including the suggested match information (user id, and/or the like) and the user information (user id and/or the like). The LCSN server may then record that the user has expressed interest in a particular suggested match 702 (e.g., by adding the user id of the potential match to a list in the user account record, and/or the like), and may retrieve further information about the suggested match that was selected in order to notify the suggested match (e.g., the system may obtain the contact information of the suggested match in order to send the suggested match a notification indicating the user's interest, the system may obtain the suggested match's profile information in order to determine whether the suggested match has provided a public contact address, phone number, and/or the like that can be given to the user in order to initiate contact, and/or the like) 750. In some implementations, the suggested match may only be sent a notification when a user has expressed non-anonymous interest in him 709. In some implementations, regardless of whether the user has expressed interest anonymously or not, the LCSN may not send a notification to the suggested match unless the suggested match also indicates a mutual interest 706 in the user. The server may also add the suggested match to a separate list kept with the user profile data structure, wherein the separate list keeps track of all suggested matches that the user has accepted from his list of suggested matches, and with which the user would like to connect. In some implementations, the suggested match may, upon receiving the notification 707, express mutual interest in the user, provide feedback on the user, and/or the like.

In some implementations, the user may also be able to provide other forms of feedback on suggested matches, such as scoring suggested matches, deleting suggested matches from the search list, favoriting suggested matches, blocking suggested matches, and/or the like 755. For example, the user may be able to score his suggested matches via a n-star rating system (e.g., a three-star rating). If the user provides a score 760, then the server may store the score in a score table of the LCSN database 765. In some implementations, the score may be stored as an XML-encoded data structure that resembles the following:

<score>
   <score_id>5754257554524563334</score_id>
   <user_id>1234567890864213579</user_id>
   <match_id>732459785698754296574</match_id>
   <score_value>3</score_value>
</score>

If the user wants to "favorite" a suggested match 780, the LCSN server may retrieve a favorites_list from the user profile 785, which may exist as a field in the user profile data structure. The server may then store the user id of the suggested match in the favorites list 790, thereby saving a reference to the favorited suggested match with the user. In some implementations, the user may be able to access favorited suggested matches in a separate window from the search results, and may be able to indicate whether or not the suggested matches may be notified that they have been favorited. Conversely, the user may choose to block the suggested match, in order to hide all of the user's activity and the user's account from the blocked party.

If the user wants to remove a suggested match from his search results 795, the server may retrieve the list of suggested matches for the user from the user profile data structure 796, and may query the list for the user id of the suggested match the user wishes to delete from the list 797. The server may then remove the user id from the list of suggested matches 798. In some implementations, the server may automatically search for another suggested match to replace the deleted suggested match; in other implementations, the server may ask the user whether the user would like to search for more suggested matches. If the feedback does not fit any of these and/or like categories, the LCSN may not store feedback information about the user 799.

The LCSN may then update the personality profile based on the feedback given for the suggested match, based on the suggested match's personality profile (e.g., the LCSN may determine new keywords for the user and/or may suggest new importance of certain keywords in the user's profile if the user ranks a suggested match highly, and/or the like), and/or the like 770. The user may then receive a notification confirming that the user's feedback has been successfully recorded 775.

Figure 8A:
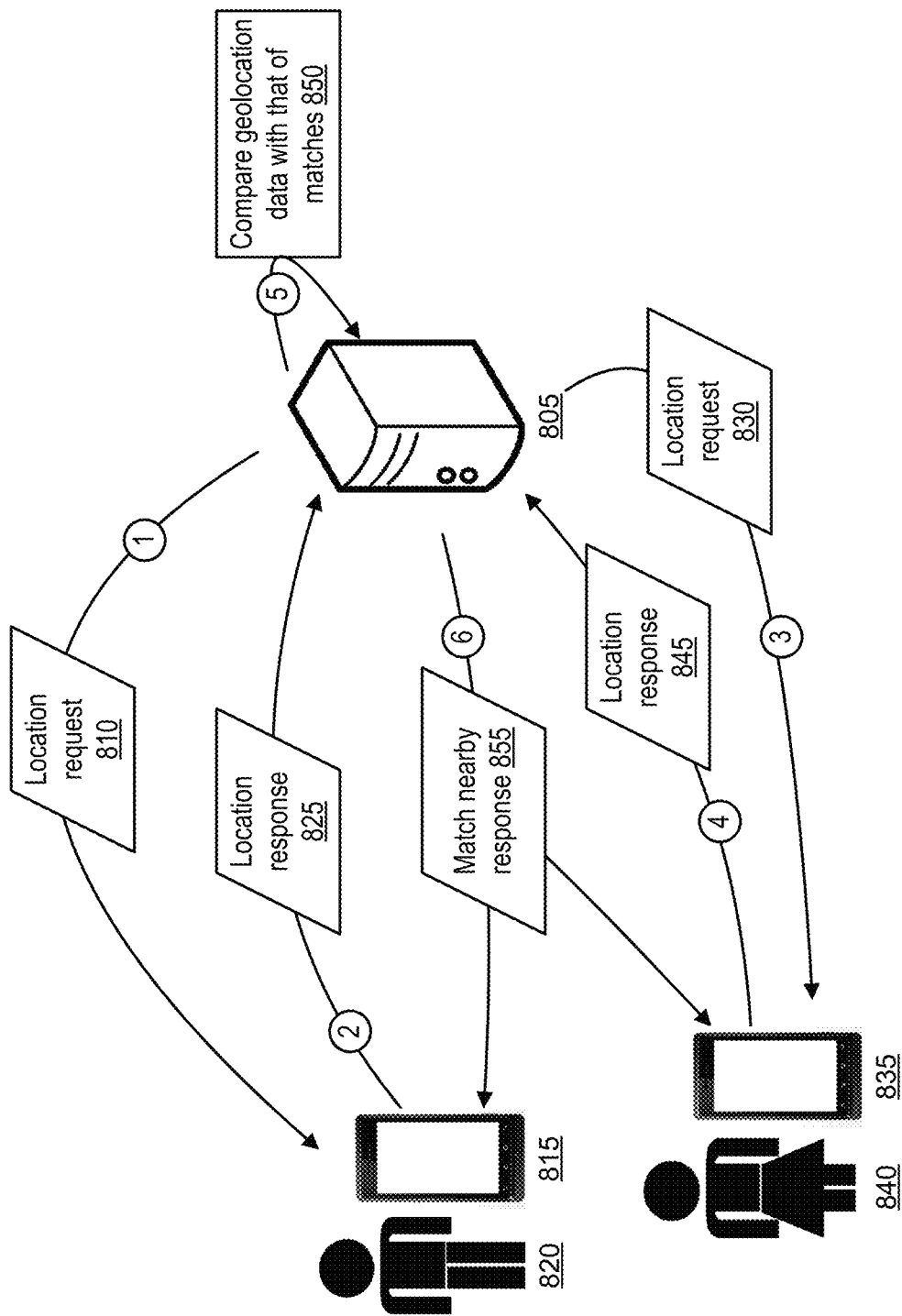
FIGS. 8a-b show data flow diagrams illustrating finding nearby potential matches in some embodiments of the LCSN.
Figure 8B:
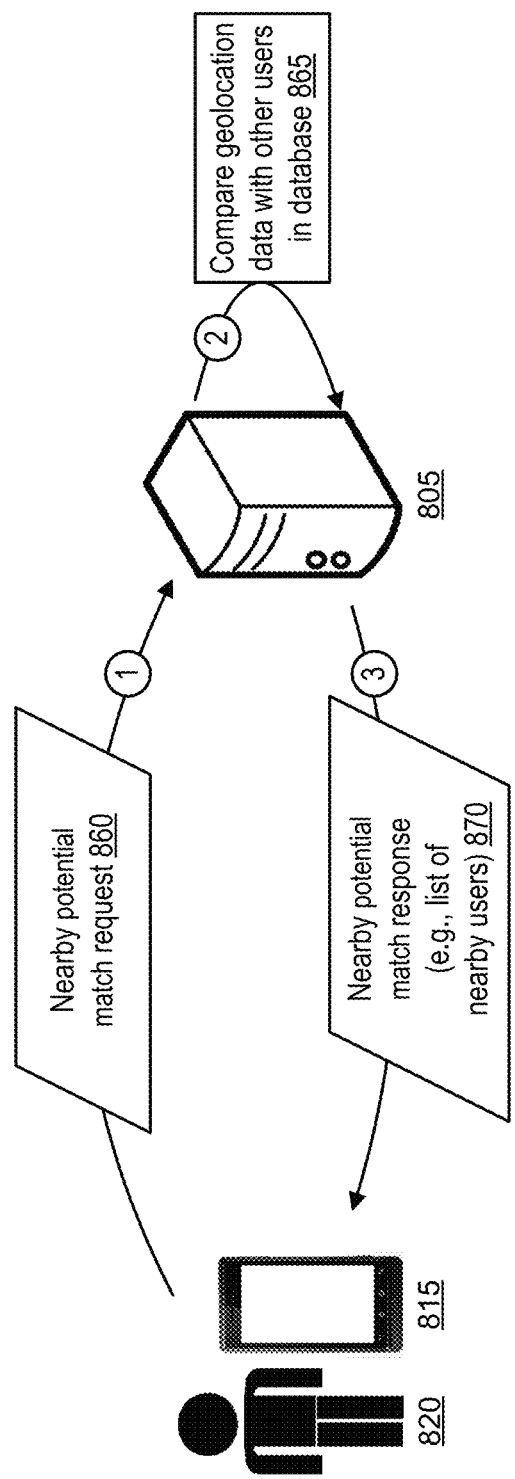

FIGS. 8a-b show data flow diagrams illustrating finding nearby potential matches in some embodiments of the LCSN. In some implementations, the LCSN server 805 may collect geolocation data about a user 820 by sending a location request 810 to the user's electronic device 815. In some implementations, the LCSN server may be prompted by the user to collect information about the user's location (e.g., the user may indicate that her location has changed and that the server should update her location). In some implementations, an exemplary XML-encoded location request may take a form similar to the following:
POST/locationrequest.php HTTP/1.1
Host: www.LCSNproccess.com
Content-Type: Application/XML
Content-Length: 788
<?XML version="1.0" encoding="UTF-8" ?>
<location_request>
<timestamp>2016-01-01 12:30:00</timestamp>
   <location_params>
    <user_id>1234567890864213579</user_id>
    <device_id>6357148498304973248</device_id>
    <action>find_location</action>
   </location_params>
</location_request>

In some implementations, the request will ask for the electronic device's GPS data in order to determine the location of the user, provided the user has allowed LCSN to collect location data from the user's electronic device in order to provide such services. In other implementations, the request will ask for nearby Wi-Fi networks, and/or the like. The electronic device may then send a location response 825 to the server. The server may send a similar location request 830 to another user 840 who is on the suggested match list for the user, in order to update the suggested match's location data via the suggested match's electronic device 835. Once the suggested match's electronic device has sent its location information via a location response 845, the server may compare the geolocation data obtained from the device with that of the suggested match 850. If the user and the suggested match are within a certain distance of each other (which may either be specified by the LCSN or by the user and/or suggested match), both the user and the suggested match may receive a notification 855 indicating that there is a suggested match nearby, which may also include information such as the suggested match's profile, the exact or approximate location of the potential match, and/or the like.

In some implementations, if the user and the potential match are not mutual matches (e.g., the user has the potential match on a suggested match list, but the potential match does not have the user on his suggested match list), the notification may only be sent to the party that has the other user on his suggested match list.

In some implementations, the user may send a nearby potential match request 860 to the server in order to obtain a list of users near the user. In some implementations, the list may be users in close proximity and may not be pre-screened for compatibility. In some implementations, the user may specify how close proximity-wise potential matches must be to the user 1210. The server may then compare geolocation data with that of other users in the database 865, and may return a list of nearby users via a nearby potential match response 870. In some implementations, the server may be limited in how many users it sends back to the user (either by a user-specified limit or a pre-determined LCSN limit). In some implementations, the users returned via the nearby potential match response may be added to the user's suggested match list. In some implementations, if the user has a potential match on his suggested match list whose location data has been updated and indicates that the potential match is out of the user's geographic region (specified by the user or the LCSN), the potential match may automatically be removed from the user's suggested match list by the LCSN. In some implementations, initiating contact with a potential match, favoriting a potential match, and/or like actions may prevent the potential match from being removed from the suggested match list.

In some implementations, the user may review the list of nearby potential matches (received either through the LCSN server's automatic scan for nearby users, or from the resulting query generated from the user's request for nearby potential matches), and may express interest in any potential matches found (whether anonymously or publicly). In some implementations, the user may only be able to express interest in potential matches found in the user's geographic area, as the LCSN may not present another user as a potential match if the other user has left the user's geographical area.

Figure 9A:
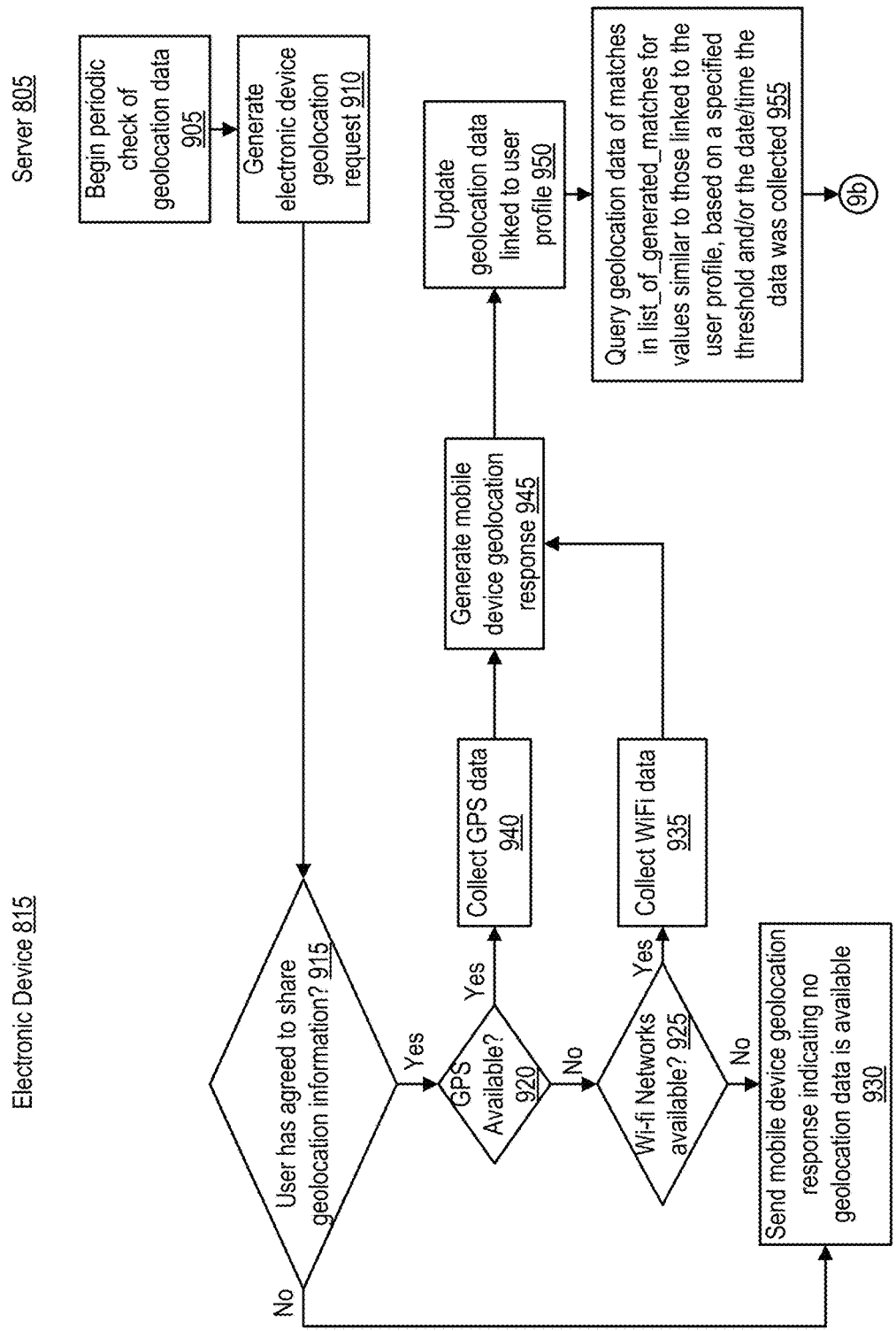
Figure 9C:
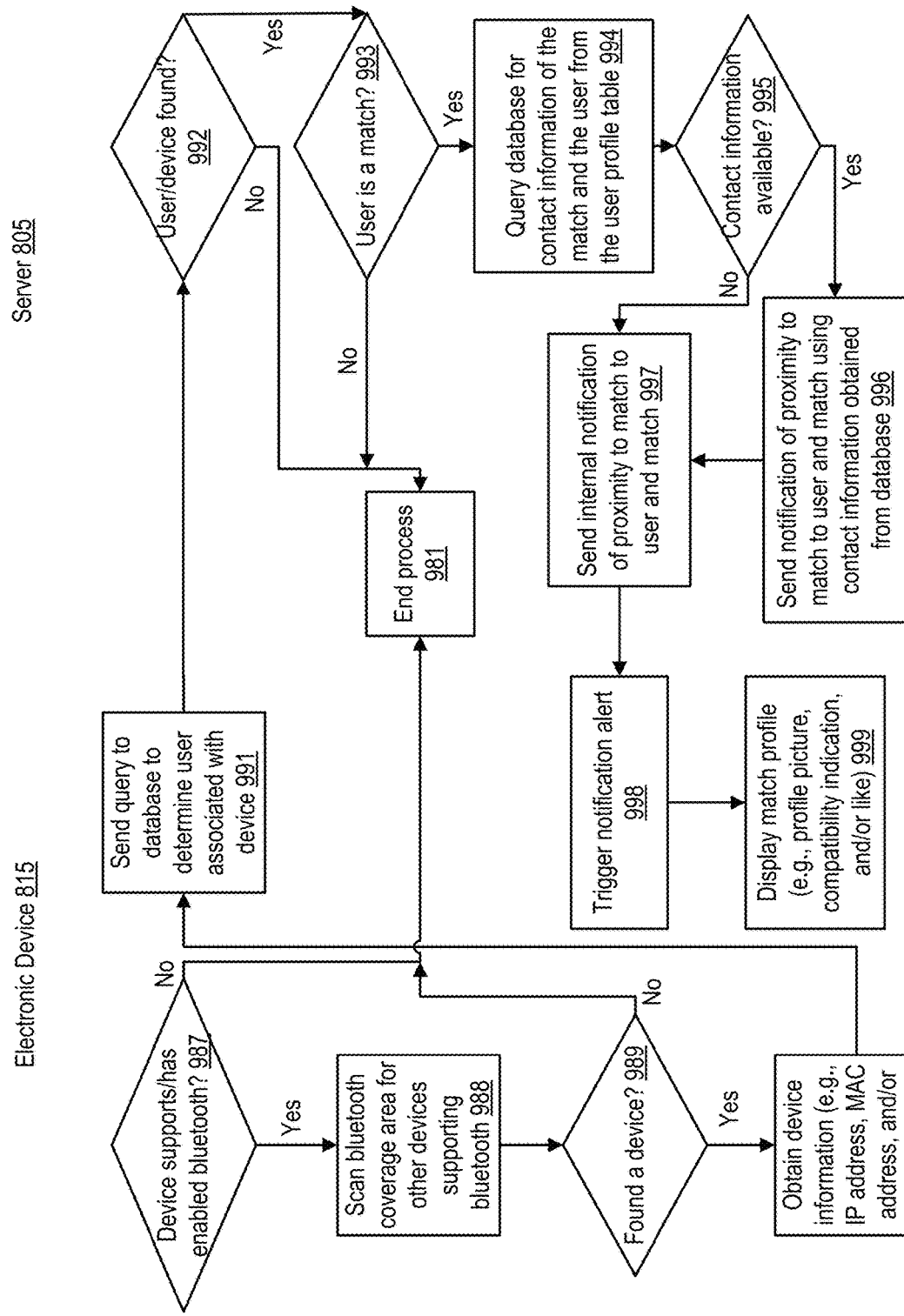

FIGS. 9a-c show logic flow diagrams illustrating finding nearby matches in some embodiments of the LCSN. In some implementations, the server may periodically check the geolocation data of users in the system 905. In order to do so, the system may generate an electronic device geolocation request 910 to send to the user's electronic device. If the user has not agreed to share his geolocation information 915, then the device may send a notification to the server indicating that no geolocation data could be obtained 930. If the user has given permission to LCSN to collect geolocation data, the electronic device may check to determine whether GPS data can be obtained from the phone 920; if the device cannot obtain GPS coordinates, then it may determine whether any Wi-Fi networks are available in the area 925. If Wi-Fi data is also unavailable, the device may send a notification to the server indicating that the geolocation of the device could not be determined. In some implementations, if the device is a cell phone or is connected to a network supported by a mobile phone provider, the device may also use cell phone triangulation in order to locate the user's device.

If the GPS or Wi-Fi network data is available, then the device may collect GPS data 940 or collect information on the available Wi-Fi networks 935 in order to determine an approximate location for the user, and may package the information in an electronic device geolocation response 945 to the server. The server may then update the geolocation data in the user profile data structure 950. In some implementations, any old geolocation data may be replaced with the new geolocation data; in other implementations, the LCSN may keep geolocation data up to a certain period of time, in order to alert users when they have reached a location that a suggested match visited recently. The server may then compare the geolocation data obtained from the electronic device to that of the suggested matches in the user's suggested match list in order to determine whether any of the suggested matches are in close proximity to the user 955. In some implementations, the date and/or time that the geolocation data was collected may be taken into account; in some implementations, if geolocation data for a suggested match has not been obtained for a pre-specified period of time, the LCSN server may obtain updated geolocation data from the suggested match. In some implementations, the degree of proximity will be determined by the user (e.g., the user may indicate that he only wants to be notified if a suggested match is within a mile of the user's location, and/or the like), by a default value determined by the LCSN, and/or the like.

If a match suggested to a user is within the specified area limits for the user 960, then the server may query the database for contact information associated with the potential match and the user from the user profile table 965. If the suggested match is not within the area, the LCSN may skip the suggested match 961 and check the location of another suggested or potential match. If contact information is available for either party 970, the system may send a message (e.g., a SMS text message, email, and/or the like) to the user and/or the potential match indicating that a potential match is close by, using the contact information stored in the database 975. If no contact information is available for either party, then the server may only send a LCSN-internal notification to the user and/or potential match, indicating that a potential match is close by 980. The user's device, based on the device settings and the method of contact used, may alert the user to the fact that a potential match is near the user 985, and may also provide the user with the potential match's profile information (such as the potential match's name, profile picture, compatibility rating, location, and/or the like) 986.

In some implementations, the LCSN may allow the user to see a list of all users close to the user's location, rather than only matches suggested to the user based on personality. In such implementations, the user may be able to sort the list of all close users based on a plurality of criteria, such as distance, compatibility, availability status, and/or the like. The user may then be able to view profiles of the nearby users and determine whether any of the users are potential matches. In some implementations, the user may anonymously indicate an interest in one of the users on the list; in other implementations, the user may choose to allow the LCSN to send a notification to the other user, indicating that the user is interested in him. In some implementations, if a user expresses anonymous interest in another user, both users may receive a notification indicating that they are potential matches for each other, if the other user indicates mutual interest in the user.

In some implementations, the user may also be notified if other potential matches are near the user via Bluetooth. In some implementations, a LCSN application may be on the user's electronic device, and may determine whether the device supports Bluetooth or has Bluetooth enabled 987. If it does not, the LCSN will not attempt to scan the area via Bluetooth 981. If it does both support Bluetooth and have it enabled, then the device may scan the Bluetooth coverage area for other devices that support Bluetooth 988. If another device is found 989, then the user's device may be able to obtain information about the found device (e.g., a device name, serial number, MAC address, IP address, and/or the like) in order to determine whether or not it belongs to someone in the LCSN database 990. If not, the LCSN will do nothing with the found device. The device may send a query to the LCSN database in order to try and find an electronic device with the information obtained, and to further determine a user associated with said device 991. If a device and user are found 992, and if the user of the found device is a match 993, then the server may query the user profile table of the LCSN database for contact information associated with the user and the match 994. If a device and/or user is not found, the LCSN will do nothing with the found device. If the user of the found device is not a match, the LCSN may do nothing further with the particular user.

If contact information is available 995, the server may send a notification of proximity to the potential match and/or user using the contact information obtained 996. If no contact information is provided, the user and/or potential match may instead receive an internal notification of proximity from the server 997. In some implementations, the user and potential match may receive an internal notification even if contact information was provided. The device, upon receiving the notification (e.g., via an internal notification in the application, via an SMS text or phone call, via an email, and/or the like), may trigger a notification alert 998 such as a message alert beep, vibrate, pop-up message, and/or the like. The device may also display for the user and potential match the profile information of the other party 999 (e.g. name, profile picture, and options to view the potential match in more detail, or to view past history with the potential match 1515, compatibility rating, location, and/or the like).

In some implementations, the device may also display a map of the user's current location 2205, along with a marker to represent the user and another to represent the user's potential match 2210, so that the user can determine where exactly in the user's current location his potential match is located. The device may also display ads 2220 related to the user's current location, which may contain deals for the user and the potential match if they choose to interact in a manner satisfying a merchant's and/or the LCSN's minimum interaction requirements.

In some implementations, the device may, rather than sending a notification to the user on a per-match basis, may provide the user with a map 2225 indicating areas where the user's potential matches are or have been located, along with information about the locations, and deals for those locations. In some implementations, areas with potential matches may be indicated by colored areas, wherein areas may be shaded different colors based on the different nature of the potential matches (e.g., potential match areas may be shaded based on compatibility, based on interests, based on number of suggested matches that have visited a particular area, and/or the like). In some implementations, users may not be able to see specific users in colored areas, depending on the specific users' privacy settings. The user may be able to click an area on the map in order to view lists of potential matches that have visited the area or are currently in the area, view information on the locations they visited, and/or the like.

In some implementations, the user, via the map, a notification in their internal message box, and/or the like, be notified whenever a "favorited" match, a blocked user, a highly compatible potential match, a potential match that the user indicated interest in (anonymously or non-anonymously), and/or a like potential match enters the geographical area of the user.

Figure 10:
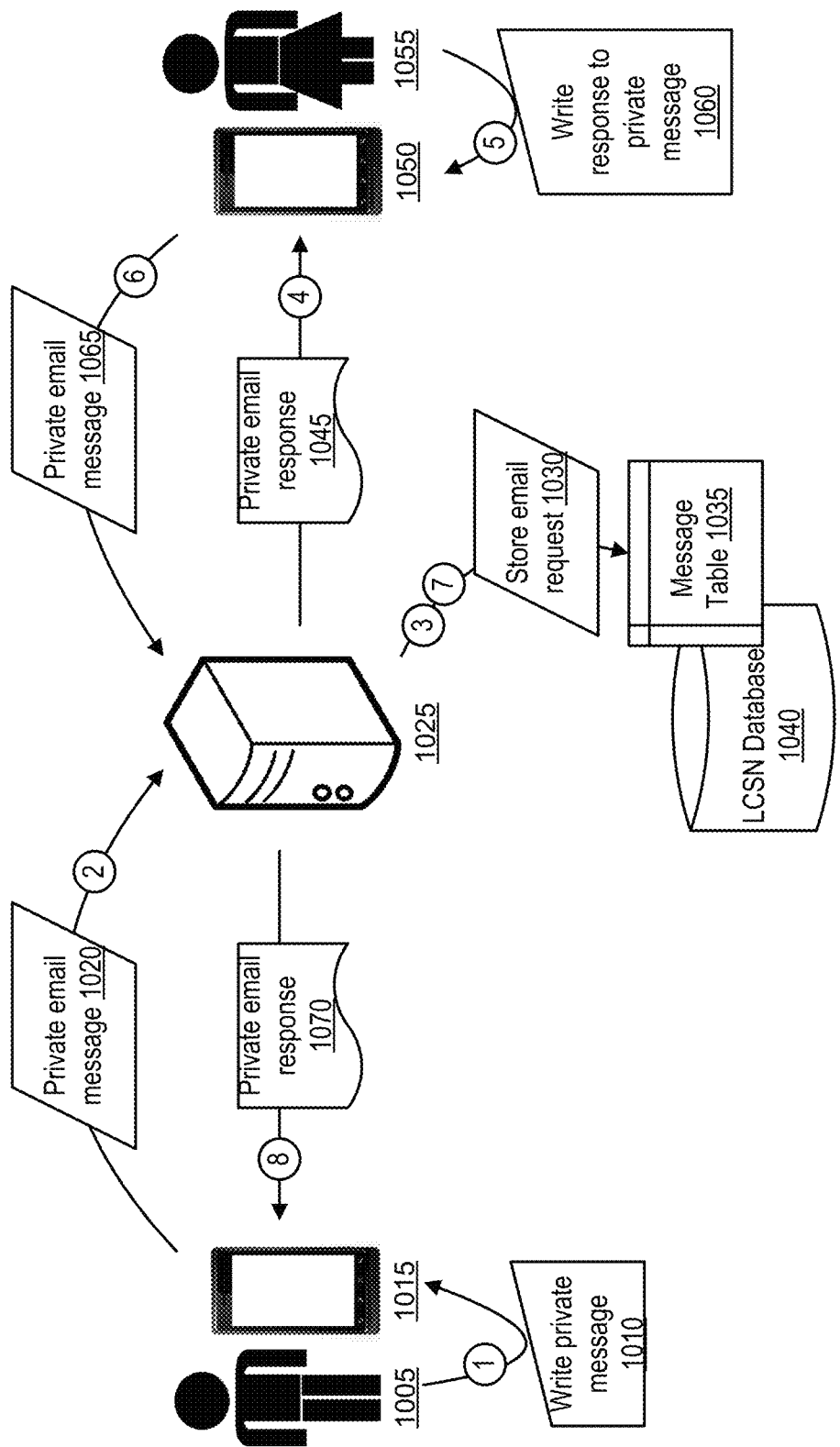
FIG. 10 shows a data flow diagram illustrating an internal messaging system in some embodiments of the LCSN.

FIG. 10 shows a data flow diagram illustrating an internal messaging system in some embodiments of the LCSN. In some implementations, a user 1005 may compose a private, LCSN-internal message 1010 on an electronic device 1015. In some implementations, the private message may also be an email message or text message sent through the LCSN. In some implementations, the user may only be able to send messages to mutual matches. In some implementations, the private message may contain text, images, and/or the like. The user's device may send the message via a private email message 1020 to the LCSN server 1025, which may store the message via a store email request 1030 to the message table 1035 of the LCSN database 1040. In some implementations, the server may then send a private email response 1045 to the user 1055 that user 1005 is contacting. The response may contain the private message that the user 1005 sent. User 1055 may then be able to compose a response 1060 to the private message received from user 1005 via user 1055's electronic device 1050. The response may be sent via another private email message 1065 to the server, which may store the response in the message table of the LCSN database, and may then invoke the server to send private email response 1070 to the user 1005, which may contain at least the private message composed by user 1055.

Figure 11:
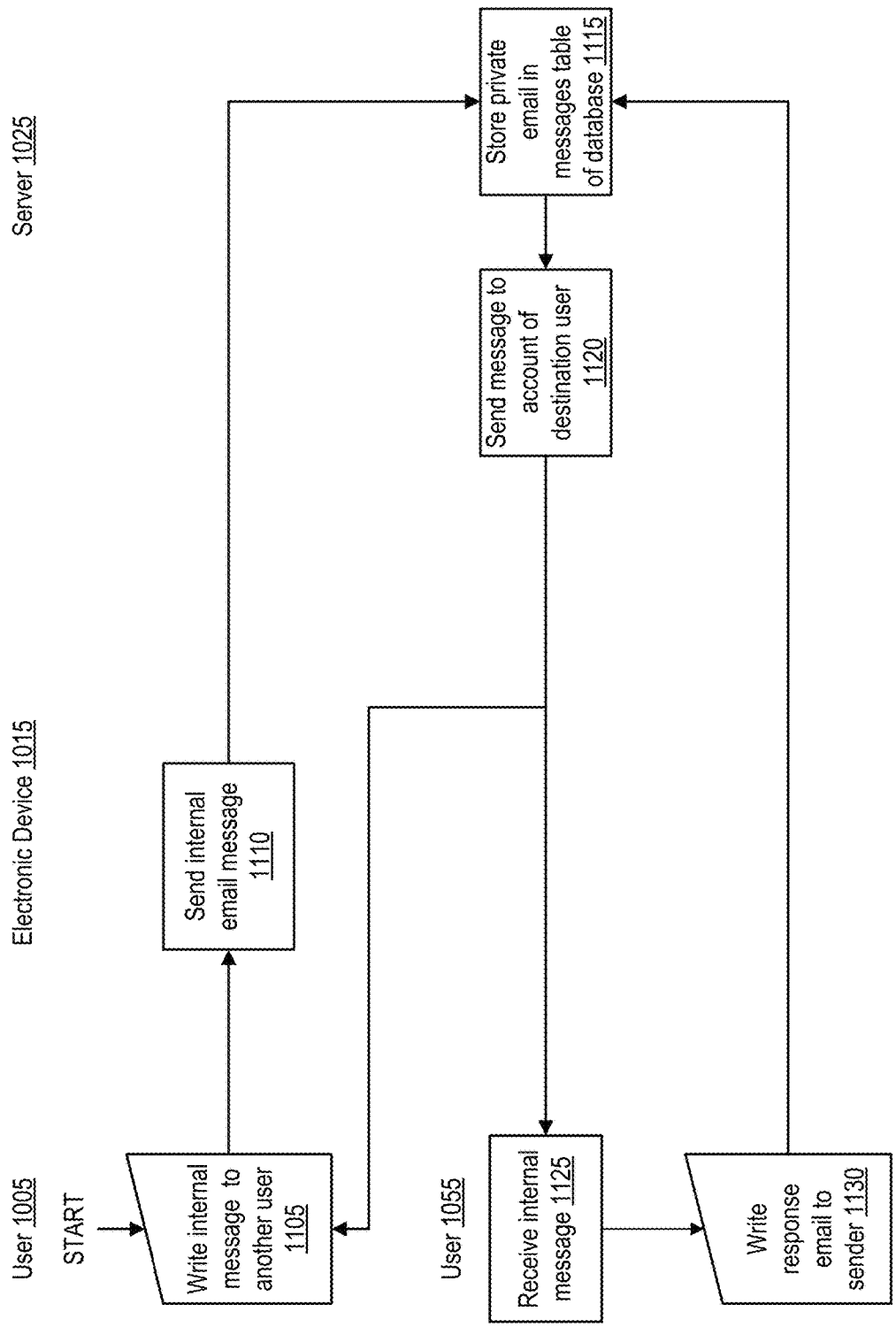
FIG. 11 shows a logic flow diagram illustrating an internal messaging system in some embodiments of the LCSN.

FIG. 11 shows a logic flow diagram illustrating an internal messaging system in some embodiments of the LCSN. In some embodiments, user 1005 may write an internal message to another user 1105 via an electronic device 1015. The device may then send an internal email message 1110 to the server 1025, which may contain at least the internal message written by user 1005. The server may then store the private message in the messages table of the LCSN database 1115, and may forward the message 1120 to the account of user 1055 (e.g., the user that user 1005 wishes to contact). User 1055 may receive the internal message 1125, and may write a response 1130 to the internal message received from user 1005. The message may be sent to the server, where it is stored in the messages table and then forwarded to user 1005.

Figure 12:
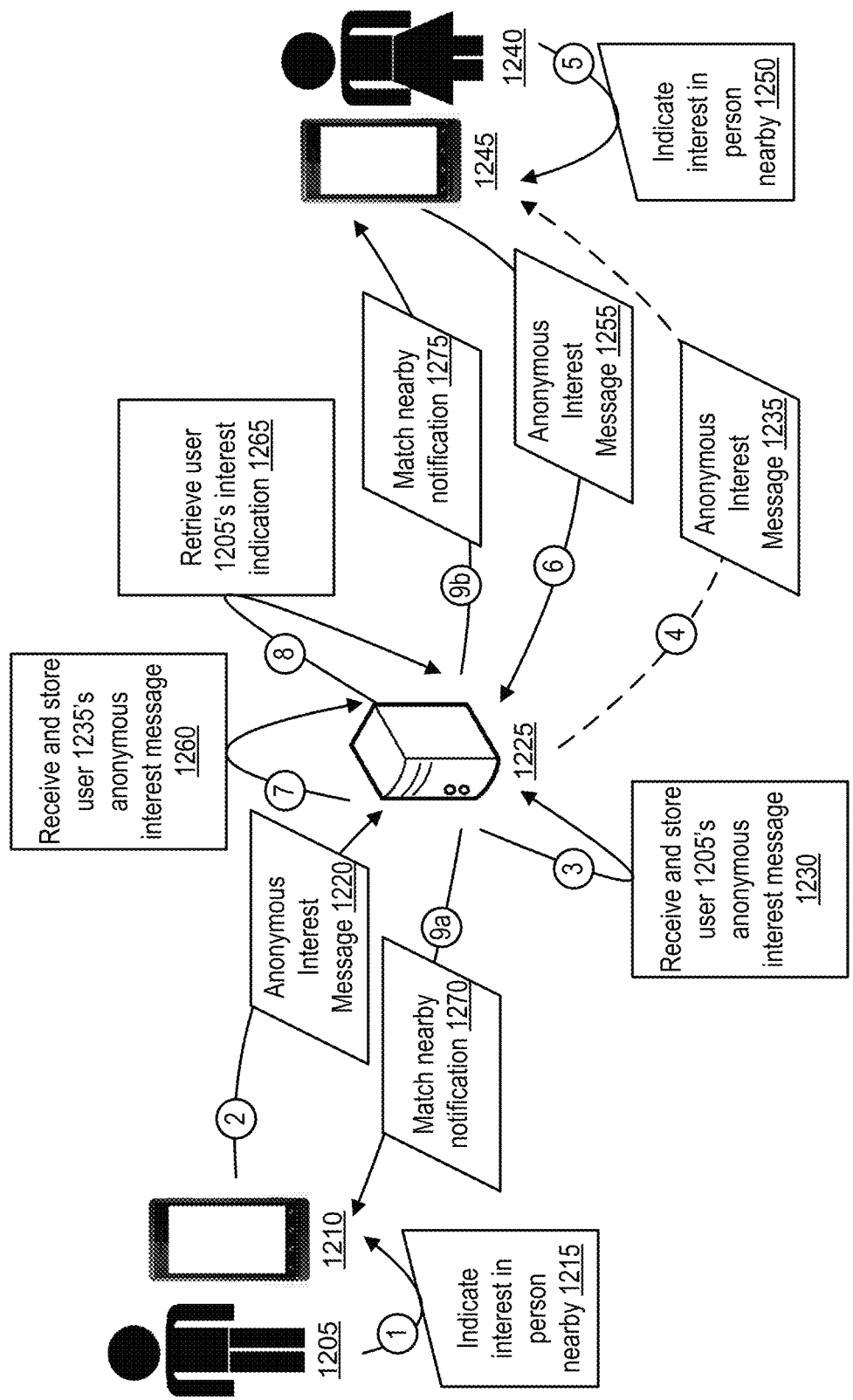
FIG. 12 shows a data flow diagram illustrating monitoring anonymous interest in some embodiments of the LCSN.

FIG. 12 shows a data flow diagram illustrating monitoring anonymous interest in some embodiments of the LCSN. In some implementations, a user 1205 may provide input to his device 1210 indicating anonymous interest 1215 in user 1240, who may be in a location close to user 1205. In some implementations, user 1205 may be kept anonymous until user 1240 also indicates an interest in user 1205. User 1205's device may send an anonymous interest message 1220 to LCSN server 1225. In some implementations, the XML-encoded anonymous interest message may take a form similar to the following:

```
POST /anonymousinterest.php HTTP/1.1
Host: www.LCSNproccess.com
Content-Type: Application/XML
Content-Length: 788
<?XML version = "1.0" encoding = "UTF-8"?>
<anonymous_interest_request>
  <timestamp>2016-01-01 12:30:00</timestamp>
  <interest_ params>
    <user_id> 1234567890864213579 </user_id>
    <interest_date>2016-01-01 12:30:00</interest_date>
    <interest_location>
      <GPS>40.7584451, -73.978912</GPS>
      <router_list>
        <router>
          <id>4983564385648</i>
          <SSID>786ac7c676be7e6dd6e7eb676c7ca687</SSID>
          <model>Cisco Linksys Smart Wi-Fi AC 1750HD
Video Pro EA6500</model>
          <band_thresholds>
            <band>
```

-continued

```
              <size>2.4, Ghz</size>
              <capacity>450, Mbps</capacity>
              <size>5, Ghz</size>
              <capacity>1300, Mbps</capacity>
          </band>
        </band_thresholds>
        <ip>173.194.68.100</ip>
        <max_ range>50</max_range>
        <max_packet_time></max_packet_time>
      <router>
      . . .
    </router_list>
  </interest_location>
  <interest_id>9988776655443322</interest_id>
  <notify>true</notify>
  <identify>false</identify>
  </interest_params>
</anonymous_interest_request>
```

In some implementations, LCSN may store 1230 the indication of interest from user 1205 in the user's record in the LCSN database. LCSN may also retrieve information about the user that user 1205 is interested in (e.g., height, eye color, hair color, age, and/or the like) and add such attributes of the person of interest when storing the interest indication. In some implementations, these attributes may be aggregated and used in the future to determine whether the user may or may not have a preference for certain qualities (e.g., whether the user has an affinity for people who are at least 5'10", for people with brown hair, for people at least two years older, and/or the like). Such preferences may be used for suggested filtering of nearby potential matches (e.g. the user may see users who match the user's predicted preference more prominently, may be notified when someone who fits the predicted preference is in close proximity to the user, and/or the like).

User 1240 may optionally receive an anonymous interest message 1235, which may indicate to user 1240 that someone has expressed anonymous interest in user 1240, but which may not indicate who (or exactly when) the user expressed anonymous interest. In other embodiments, LCSN may not send a message to user 1240 about the anonymous indication of interest. In some embodiments, user 1205 may also receive a notification if anyone that he has previously indicated interest in moves within proximity to him. For example, if user 1205 indicates interest in someone at a coffee shop, and then moves into close proximity to the person again at a park, LCSN may send user 1205 a notification indicating that the person is nearby again, and may give user 1205 the opportunity to provide his identity to the person, to send a direct notification of interest to the person, and/or the like.

In some implementations, user 1240 may not indicate an interest in user 1205 (anonymous or otherwise) while in the same location where user 1205 expresses interest, but may, via her electronic device 1245, indicate anonymous interest 1250 in user 1205 at a later time, and/or in another location, and/or the like. In some implementations, the user's electronic device may send an anonymous interest request 1255 to the LCSN server. In some implementations, the anonymous interest request 1255 may take a form similar to anonymous interest request 1220. The LCSN server may receive and store 1260 user 1240's anonymous interest, and may check the LCSN database to determine whether the user that user 1240 showed interest in has also shown interest in her. If found, LCSN may retrieve 1265 the record of user 1205's interest indication, and may use information such as the date and location at which the indication was made to generate a match notification 1270 for user 1205, and a match notification 1275 for user 1245. In some implementations, the match notifications may contain information such as when and/or where the first indication of interest was made, when and/or where the second indication of interest was made, and/or like information.

Figure 13:
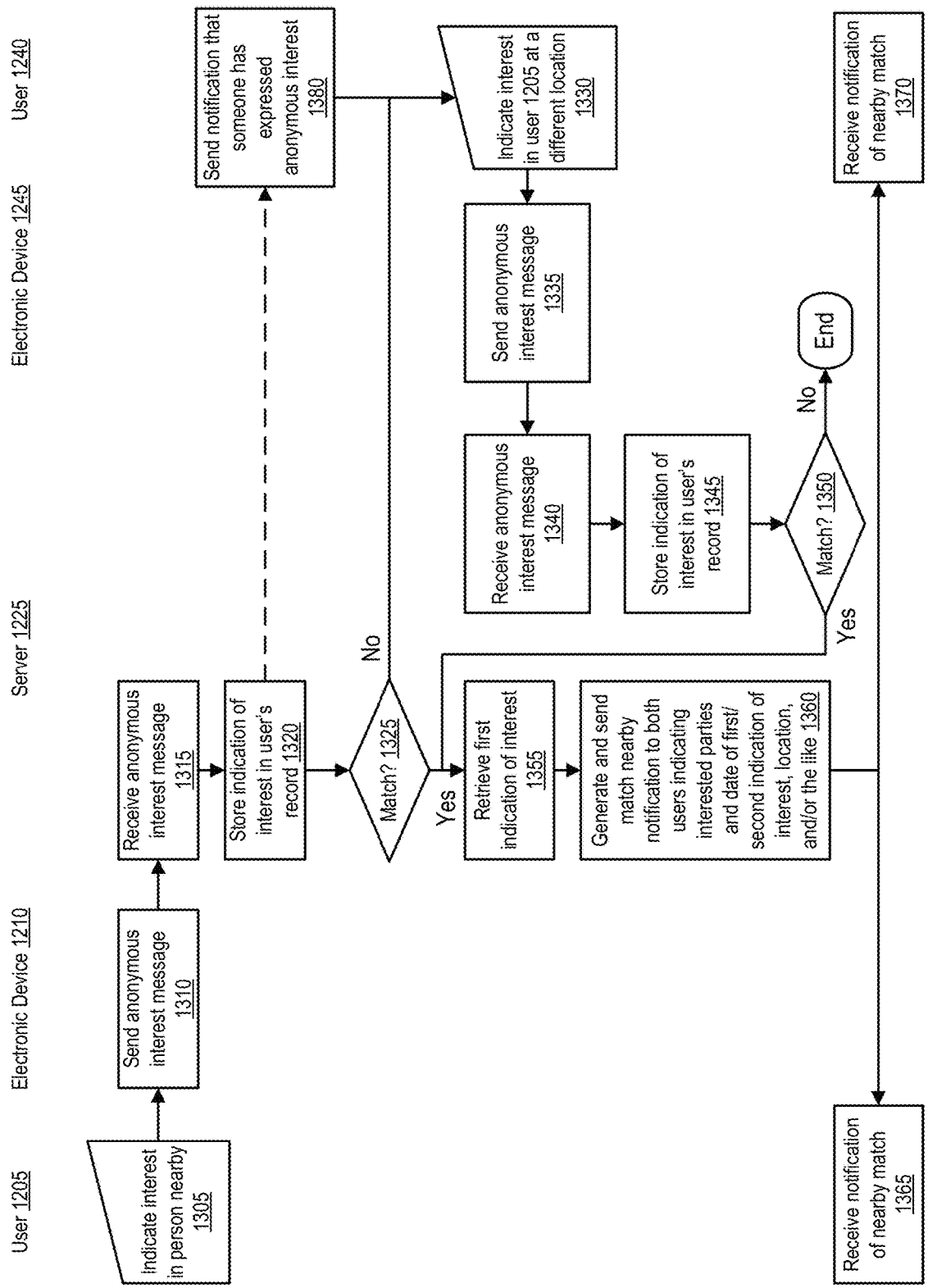
FIG. 13 shows a logic flow diagram illustrating monitoring anonymous interest messaging system in some embodiments of the LCSN.

FIG. 13 shows a logic flow diagram illustrating monitoring anonymous interest messaging system in some embodiments of the LCSN. In some implementations, user 1205 may indicate interest in another user nearby 1305, via interacting with the user's electronic device. The electronic device may send an anonymous interest message 1310 to LCSN, which may receive the anonymous interest message 1315 and may store the indication of interest 1320 in the user's account record. LCSN may also send a notification to user 1240 indicating that someone has anonymously expressed interest in her. LCSN may also determine whether user 1240 has already expressed interest 1325 in 1205. If not, LCSN may not send any further notifications unless user 1240 indicates an interest 1330 in user 1205 (e.g., at a different location and/or the like). User 1240 may do so via providing interest input to her electronic device, which may send 1335 an anonymous interest message to the LCSN server. The LCSN server may receive 1340 the message and store user 1240's indication of interest in the user's record 1345. LCSN may then check 1350 to see whether user 1205 has indicated interest in 1240. If user 1205 has already indicated anonymous interest in user 1240 before, the LCSN server may retrieve 1355 the first indication of interest between the two, and may generate and send 1360 a match nearby notification 1365 to user 1205, and a match nearby notification 1370 to user 1240, indicating the identity of the identified parties, the date and/or locations of each indication of interest, and/or the like. In some implementations, the notification may not identify either user, and each user may manually identify themselves to the other user if the user is still interested.

Figure 14B:
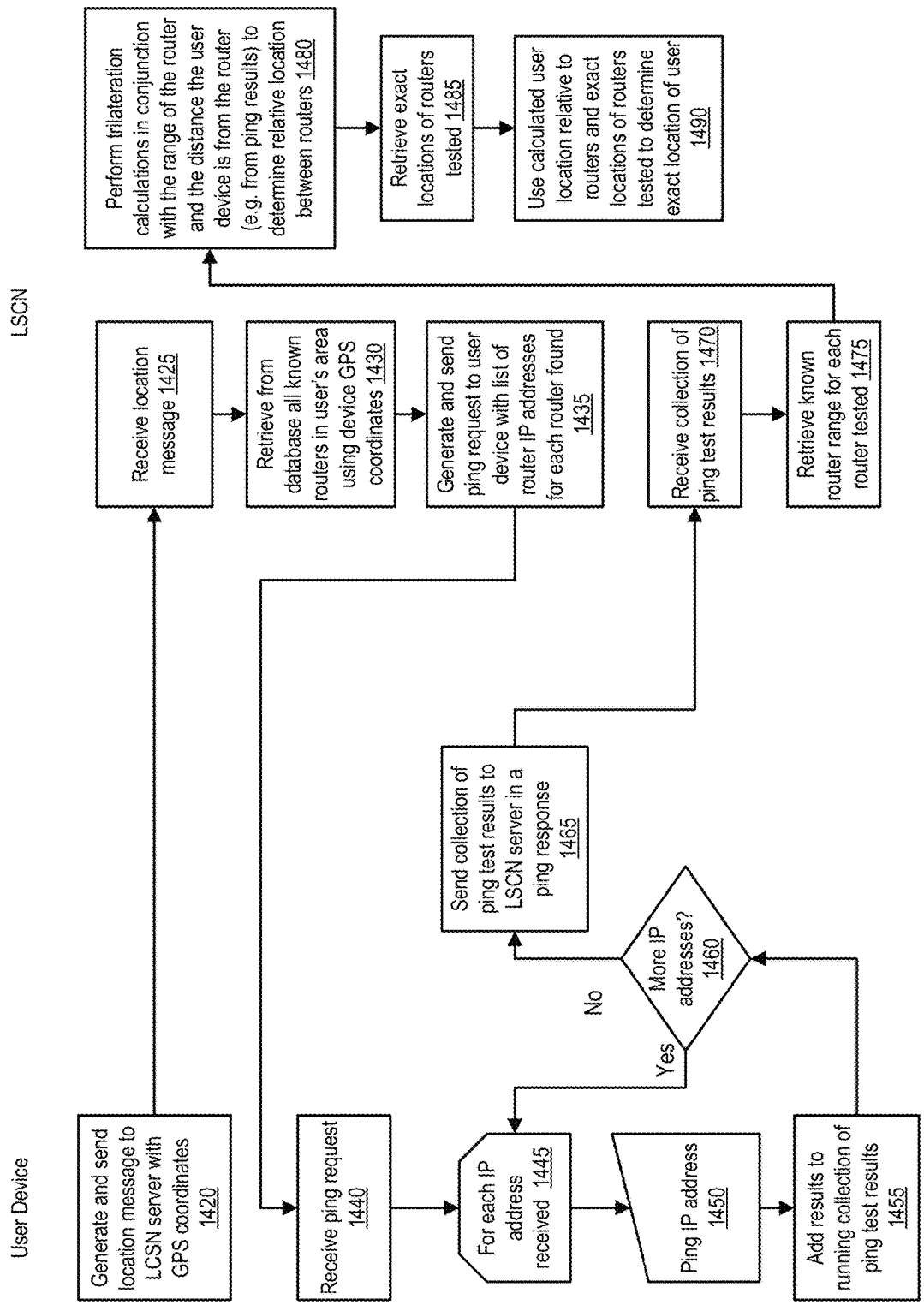

FIGS. 14*a-b* show block diagrams illustrating determining location with Wi-Fi signals in some embodiments of the LCSN. In some implementations, a user 1405 using electronic device 1410 may be in range of a variety of Wi-Fi networks powered by routers 1415*a-c*. In some embodiments, LCSN may use the user's GPS coordinates, coupled with the strength of the signals from the routers in the area relative to the user's electronic device, to determine a more exact location for the user.

For example, in some implementations, the user device may generate and send 1420 a location message to LCSN with GPS coordinates (the location message resembling the location response 825). In some implementations, LCSN may receive the message, and may retrieve 1430 from the LCSN database all known wireless routers in the user's area, based on the user's GPS coordinates and/or like location indicia. LCSN may send a ping request 1435 to the user's device with a list of router IP addresses for each router found. The user's device, upon receiving the request 1440, may, for each IP address 1445, ping the IP address provided 1450, and may keep track 1455 of the results of the ping in an aggregated collection of ping test results. If there is another IP address to ping 1460, the device may move to the next IP address and perform the same action; if not, the device may send 1465 the collection of ping test results to LCSN via a ping response. The LCSN may then receive 1470 the ping test results and, after retrieving 1475 all known router ranges for each router tested, may perform trilateration calculations 1480, using the router ranges along with the ping results for the routers as the radii for the calculation. In some implementations, this calculation may allow LCSN to determine where in relation to the routers the user is located; LCSN may then be able to retrieve 1485 from the LCSN database the exact locations of the tested routers, and may be able to calculate, using the exact locations of the routers and the relative location of the user in relation to the routers, to determine the exact location of the user 1490. In some implementations, this location determination may be used to determine, for example, where in a building a user is located (e.g. see FIGS. 22*a*, 24*a-c*).

Figure 18:
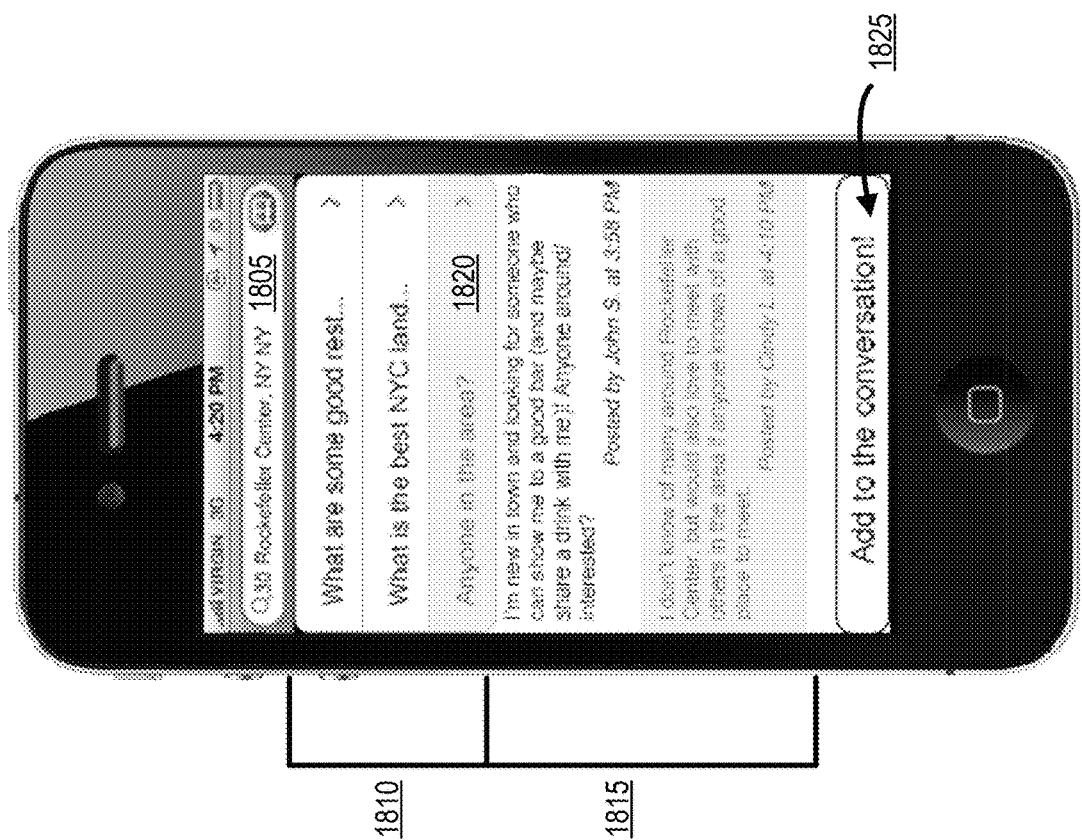
FIG. 18 shows a screenshot diagram illustrating location-dependent forums in some embodiments of the LCSN.

FIG. 18 shows a screenshot diagram illustrating location-dependent forums in some embodiments of the LCSN. In some implementations, LCSN may provide a forum-like interface for people within the same region to communicate with each other, via polls, debates, messages, and/or the like. For example, a user may be able to provide their location (e.g. the name of a public landmark and/or significant regional location, a street address, and/or the like) in a search bar 1805. In some implementations, LCSN may automatically input the user's location based on the user's current GPS coordinates and/or the like. The user may then see a collection of topics 1810 which have been created by people in the same area. By clicking on a particular topic 1820, the topic may be highlighted, and the user may see all the messages 1815 posted by other users in the area, including the body of the message, the user who posted the message, the date and/or time at which the message was posted, and/or the like. In some implementations the user may be able to click on the name of any user who has posted a response to see his or her profile. In some implementations the user may also click on a button in order to contribute to the topic.

Figure 19:
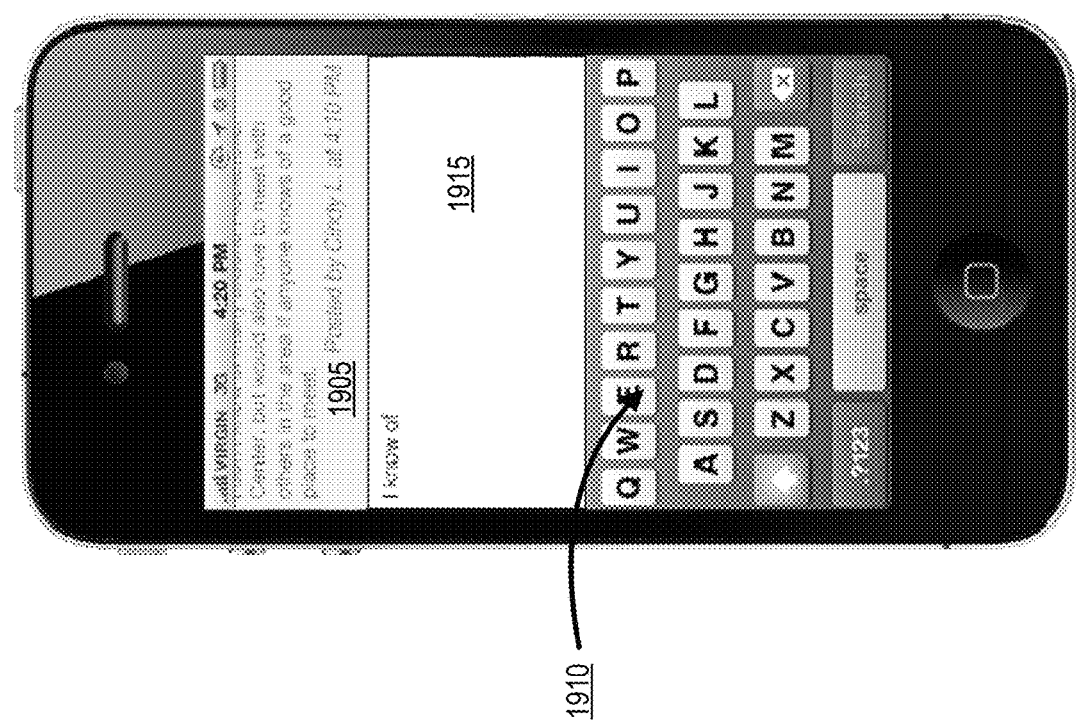
FIG. 19 shows a screenshot diagram illustrating interacting with location-dependent forums in some embodiments of the LCSN.

FIG. 19 shows a screenshot diagram illustrating interacting with location-dependent forums in some embodiments of the LCSN. In some implementations, the user may be able to view the last-posted message in the topic 1905. The user may use a keyboard interface 1910 to enter a message into box 1915, and may be able to press "enter" and/or a like key in order to post the message. The user may also be able to use his/her device's speech recognition capabilities to speak his/her message and to post it to the topic.

Figure 20:
FIG. 20 shows a screenshot diagram illustrating location-dependent polls in some embodiments of the LCSN.

FIG. 20 shows a screenshot diagram illustrating location-dependent polls in some embodiments of the LCSN. In some implementations, the user may be able to answer polls 2005 posted by other users. The polls may display a question along with a set of answers 2010, which may have radio buttons 2015 the user may select in order to answer the poll. In some implementations a user may also be able to use check boxes instead of radio buttons in order to allow other users to select more than one answer. A user may then be able to click a button 2020 in order to submit an answer and/or to see the results of the poll.

Figure 21:
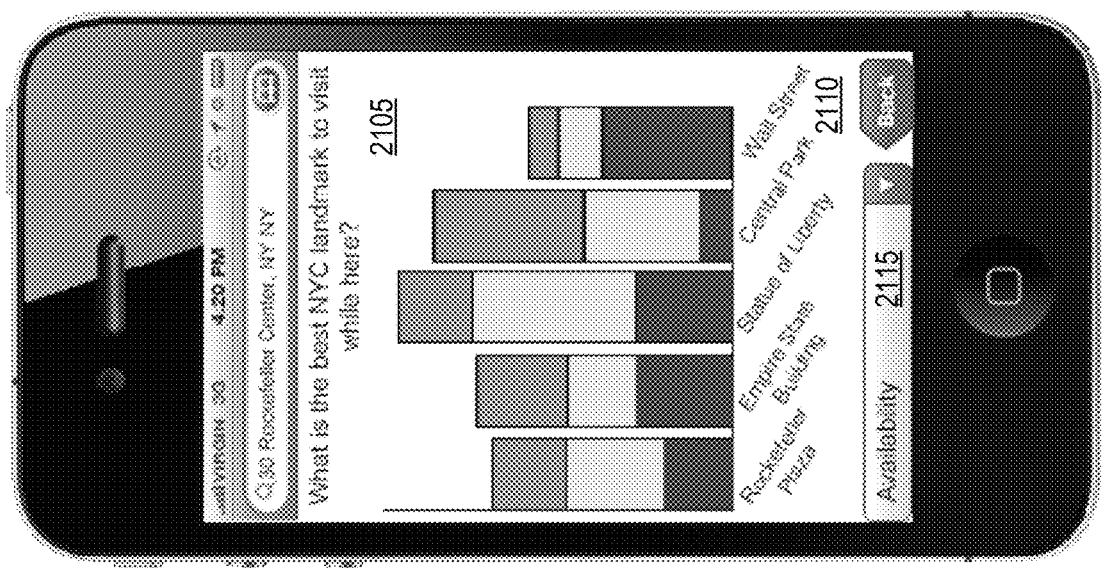
FIG. 21 shows a screenshot diagram illustrating visualizations of poll demographics in some embodiments of the LCSN.
Figure 22A:
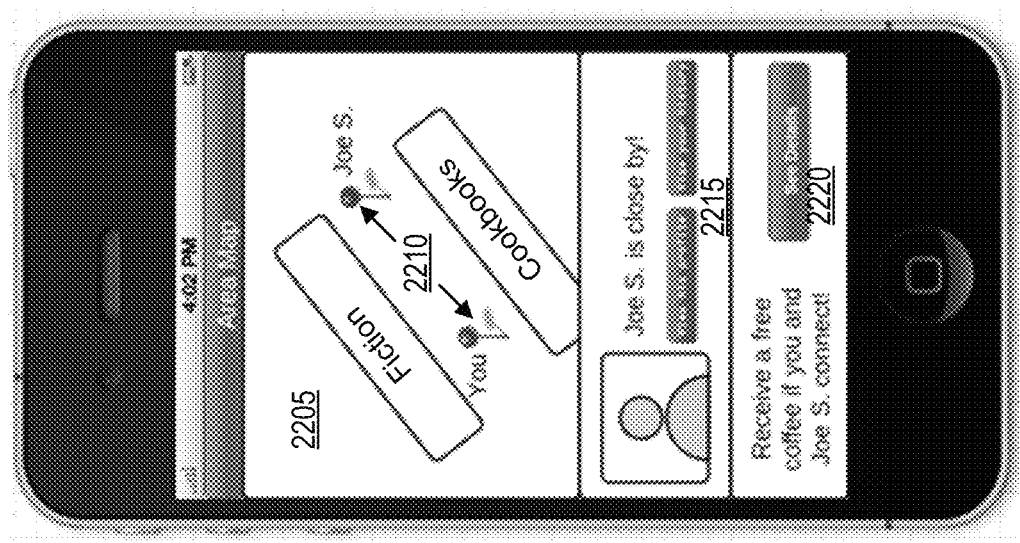
FIGS. 22a-b show screenshot diagrams illustrating match proximity maps in some embodiments of the LCSN.
Figure 22B:

FIG. 21 shows a screenshot diagram illustrating visualizations of poll demographics in some embodiments of the LCSN. In some implementations, LCSN may generate a graph or chart visualization 2105 to display the results of the poll. In some implementations the graph or chart may be a bar graph, a pie chart, and/or the like, and may show a legend 2110. In some implementations the poll may also have a sort selector 2115 that may allow the user to change the way the data is displayed based on a variety of factors. For example, if the user chooses "availability," the graph and/or chart may show the user, for each possible answer, which percentage of the responders are available, which are unavailable, and which are tentatie; if the user chooses "age," the graph and/or chart may show the user which percentage of the responders for each answer are 18-24, which are 25-45, which are 45-70, which are 71-, and/or like age ranges, and/or the like. Other factors may include occupation, gender, sexuality, interests (e.g. sports, movies, and/or the like), and/or like factors.

Figure 23A:
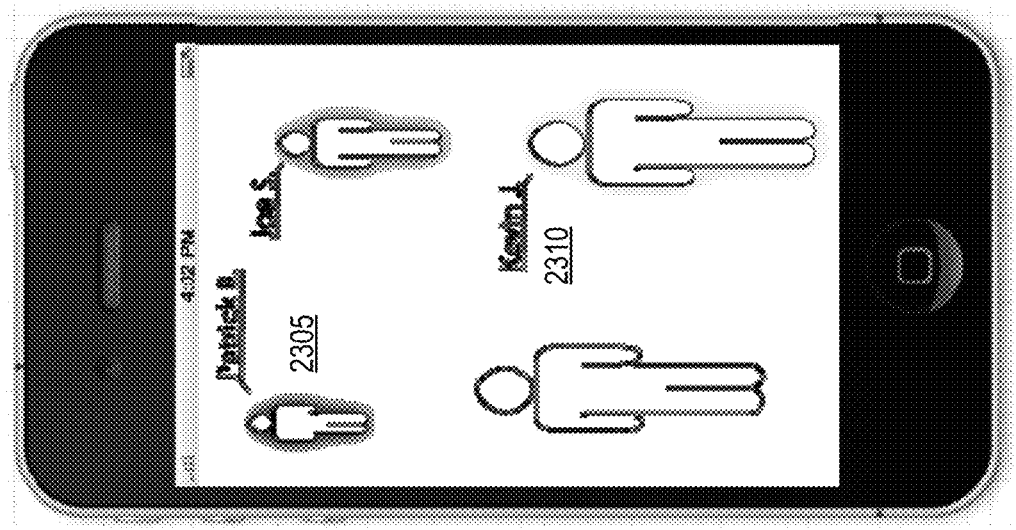
FIGS. 23a-b show screenshot diagrams illustrating augmented reality interfaces in some embodiments of the LCSN.
Figure 23B:

FIGS. 23a-b show screenshot diagrams illustrating augmented reality interfaces in some embodiments of the LCSN. In some implementations, the user's mobile device may be able to use augmented reality technology in order to show the user information about people around him that are also using the LCSN. For example, if the user's electronic device has a camera and/or a like device, the user may be able to view people surrounding the user via the device. If the person is recognized as being a user of the LCSN, the device may be able to obtain information about the user, such as the user's name and/or username and the user's availability, and/or the like. The device may then display a color-coded aura on or around the other user 2305, depending on the other user's availability, may display the other user's name and/or username 2310, and/or like information. In some implementations, the LCSN may use an image processing component to utilize face-recognition to identify users 2315. In other implementations, the device may display the colored aura around the name of the other user 2320, along with the user rating for the other user, and/or the like.

In some implementations, further image processing may also be utilized in order to determine an exact or approximate location of a user in a defined geographic area. For example, the LCSN may use image processing to compare the setting of the user to images stored on the LCSN server pertaining to locations and venues within the user's GPS (or otherwise)-determined location, and may use the comparison to determine the exact address of the user, the specific area of a building the user is in, and/or the like. In some implementations, such information is, by default, private and unavailable to other users, unless the user opts to have this information made public for other users in the LCSN.

Figure 24A:
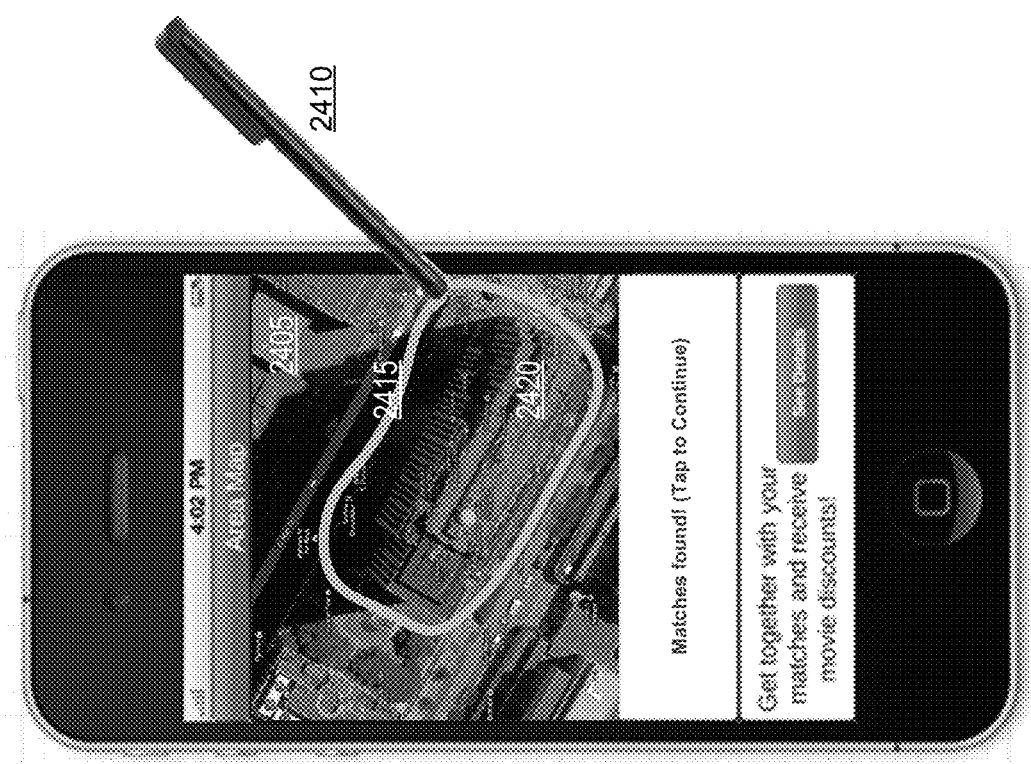
FIGS. 24a-c show screenshot diagrams illustrating further augmented reality interfaces in some embodiments of the LCSN.
Figure 24B:
Figure 24C:
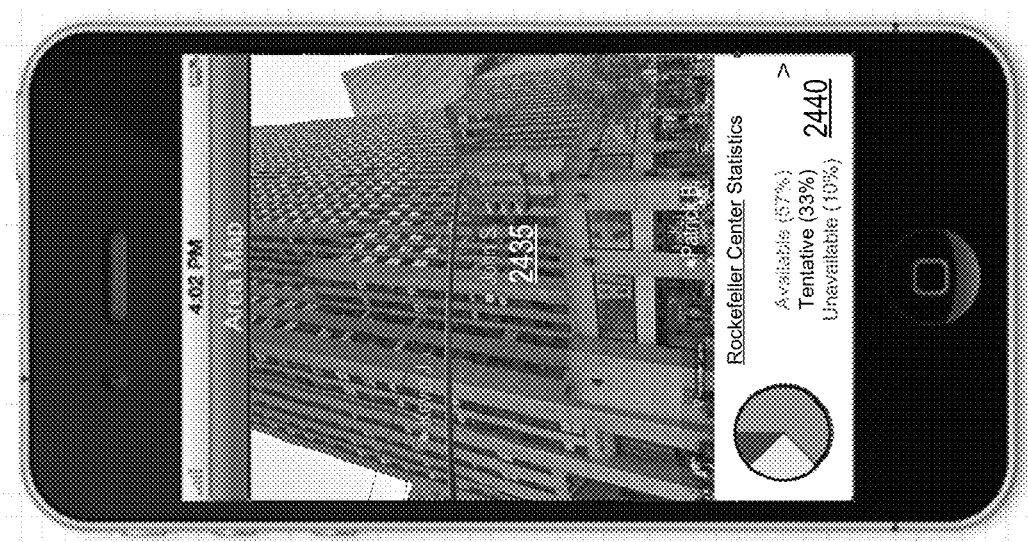

In some implementations, as in FIGS. 24a-c, a user may be able to view information about a particular building via a map interface or via the user's electronic device's camera. In some implementations, the user may be able to view a map 2405, such as from Google Maps, Bing Maps, Mapquest, and/or a like electronic map service. In some implementations, the user may be able to use a stylus 2410, a finger, and/or a like tool in order to select 2415 buildings, parks, and/or like areas 2420 to select and analyse for possible matches. In some implementations, LCSN may show possible matches on the map 2430 via markers indicating where the possible matches are in the building, their availability, and/or the like. In some implementations, LCSN may use stored and/or determined dimensions for the building to determine the area in which to search for possible matches. The user may also be shown a list 2425 of all the users indicated on the map, which the user may select in order to view their profiles. In some implementations, the user may also be able to, through their device's camera and/or the like, view a building, park, and/or the like, and view an indication of where potential matches may be in the building 2435. The user may also view statistics 2440 for the building that the user is viewing, such as the percentage of people in the building who are available, and/or the like.

LCSN Controller

Figure 25:
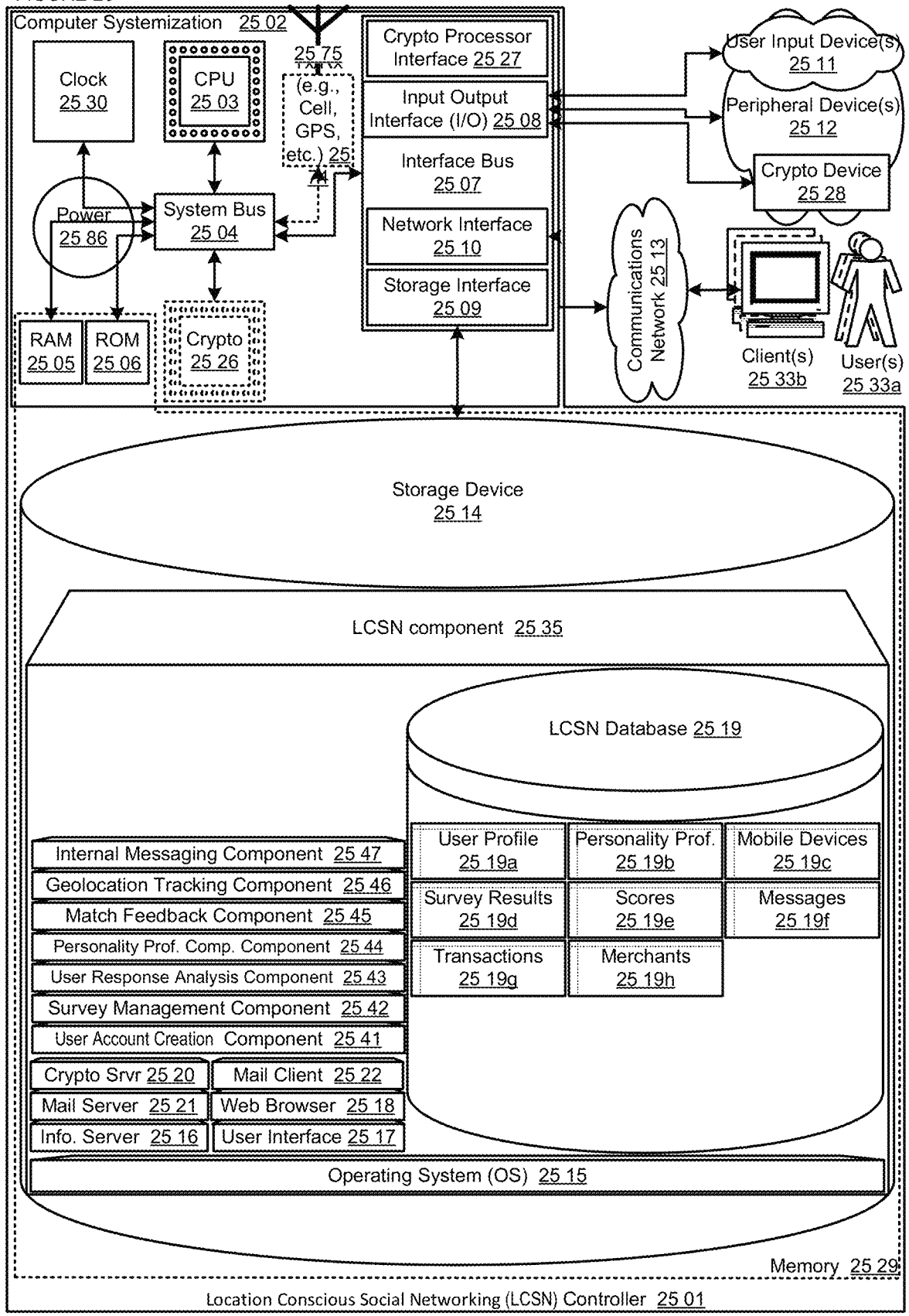
FIG. 25 shows a block diagram illustrating embodiments of a LCSN controller.

FIG. 25 shows a block diagram illustrating embodiments of a LCSN controller. In this embodiment, the LCSN controller 2501 may serve to aggregate, process, store, search, serve, identify, instruct, generate, match, and/or facilitate interactions with a computer through mobile device and social networking technologies, and/or other related data.

Typically, users, which may be people and/or other systems, may engage information technology systems (e.g., computers) to facilitate information processing. In turn, computers employ processors to process information; such processors 2503 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 2529 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the LCSN controller 2501 may be connected to and/or communicate with entities such as, but not limited to: one or more users from user input devices 2511; peripheral devices 2512; an optional cryptographic processor device 2528; and/or a communications network 2513.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The LCSN controller 2501 may be based on computer systems that may comprise, but are not limited to, components such as: a computer systemization 2502 connected to memory 2529.

Computer Systemization

A computer systemization 2502 may comprise a clock 2530, central processing unit ("CPU(s)" and/or "processor(s)" (these terms are used interchangeable throughout the disclosure unless noted to the contrary)) 2503, a memory 2529 (e.g., a read only memory (ROM) 2506, a random access memory (RAM) 2505, etc.), and/or an interface bus 2507, and most frequently, although not necessarily, are all interconnected and/or communicating through a system bus 2504 on one or more (mother)board(s) 2502 having conductive and/or otherwise transportive circuit pathways through which instructions (e.g., binary encoded signals) may travel to effectuate communications, operations, storage, etc. The computer systemization may be connected to a power source 2586; e.g., optionally the power source may be internal. Optionally, a cryptographic processor 2526 and/or transceivers (e.g., ICs) 2574 may be connected to the system bus. In another embodiment, the cryptographic processor and/or transceivers may be connected as either internal and/or external peripheral devices 2512 via the interface bus I/O. In turn, the transceivers may be connected to antenna(s) 2575, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing LCSN controller to determine its location)); Broadcom BCM4329FKUBG transceiver chip (e.g., providing 802.11n, Bluetooth 2.1+EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 2529 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the LCSN controller and beyond through various interfaces. Should processing requirements dictate a greater amount speed and/or capacity, distributed processors (e.g., Distributed LCSN), mainframe, multi-core, parallel, and/or supercomputer architectures may similarly be employed. Alternatively, should deployment requirements dictate greater portability, smaller Personal Digital Assistants (PDAs) may be employed.

Depending on the particular implementation, features of the LCSN may be achieved by implementing a microcontroller such as CAST's R8051XC2 microcontroller; Intel's MCS 51 (i.e., 8051 microcontroller); and/or the like. Also, to implement certain features of the LCSN, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the LCSN component collection (distributed or otherwise) and/or features may be implemented via the microprocessor and/or via embedded components; e.g., via ASIC, coprocessor, DSP, FPGA, and/or the like. Alternately, some implementations of the LCSN may be implemented with embedded components that are configured and used to achieve a variety of features or signal processing.

Depending on the particular implementation, the embedded components may include software solutions, hardware solutions, and/or some combination of both hardware/software solutions. For example, LCSN features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the LCSN features. A hierarchy of programmable interconnects allow logic blocks to be interconnected as needed by the LCSN system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the LCSN may be developed on regular FPGAs and then migrated into a fixed version that more resembles ASIC implementations. Alternate or coordinating implementations may migrate LCSN controller features to a final ASIC instead of or in addition to FPGAs. Depending on the implementation all of the aforementioned embedded components and microprocessors may be considered the "CPU" and/or "processor" for the LCSN.

Power Source

The power source 2586 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 2586 is connected to at least one of the interconnected subsequent components of the LCSN thereby providing an electric current to all subsequent components. In one example, the power source 2586 is connected to the system bus component 2504. In an alternative embodiment, an outside power source 2586 is provided through a connection across the I/O 2508 interface. For example, a USB and/or IEEE 1394 connection carries both data and power across the connection and is therefore a suitable source of power.

Interface Adapters

Interface bus(ses) 2507 may accept, connect, and/or communicate to a number of interface adapters, conventionally although not necessarily in the form of adapter cards, such as but not limited to: input output interfaces (I/O) 2508, storage interfaces 2509, network interfaces 2510, and/or the like. Optionally, cryptographic processor interfaces 2527 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 2509 may accept, communicate, and/or connect to a number of storage devices such as, but not limited to: storage devices 2514, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 2510 may accept, communicate, and/ or connect to a communications network 2513. Through a communications network 2513, the LCSN controller is accessible through remote clients 2533b (e.g., computers with web browsers) by users 2533a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed LCSN), architectures may similarly be employed to pool, load balance, and/or otherwise increase the communicative bandwidth required by the LCSN controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 2510 may be used to engage with various communications network types 2513. For example, multiple network interfaces may be employed to allow for the communication over broadcast, multicast, and/or unicast networks.

Input Output interfaces (I/O) 2508 may accept, communicate, and/or connect to user input devices 2511, peripheral devices 2512, cryptographic processor devices 2528, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 2511 often are a type of peripheral device 512 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 2512 may be connected and/or communicate to I/O and/or other facilities of the like such as network interfaces, storage interfaces, directly to the interface bus, system bus, the CPU, and/or the like. Peripheral devices may be external, internal and/or part of the LCSN controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the LCSN controller may be embodied as an embedded, dedicated, and/or monitor-less (i.e., headless) device, wherein access would be provided over a network interface connection.

Cryptographic units such as, but not limited to, microcontrollers, processors 2526, interfaces 2527, and/or devices 2528 may be attached, and/or communicate with the LCSN controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+ MB/s of cryptographic instructions; VLSI Technology's 33 MHz 6868; and/or the like.

Memory

Generally, any mechanization and/or embodiment allowing a processor to affect the storage and/or retrieval of information is regarded as memory 2529. However, memory is a fungible technology and resource, thus, any number of memory embodiments may be employed in lieu of or in concert with one another. It is to be understood that the LCSN controller and/or a computer systemization may employ various forms of memory 2529. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 2529 will include ROM 2506, RAM 2505, and a storage device 2514. A storage device 2514 may be any conventional computer system storage. Storage devices may include a drum; a (fixed and/or removable) magnetic disk drive; a magneto-optical drive; an optical drive (i.e., Blu-ray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 2529 may contain a collection of program and/or database components and/or data such as, but not limited to: operating system component(s) 2515 (operating system); information server component(s) 2516 (information server); user interface component(s) 2517 (user interface); Web browser component(s) 2518 (Web browser); database(s) 2519; mail server component(s) 2521; mail client component(s) 2522; cryptographic server component(s) 2520 (cryptographic server); the LCSN component(s) 2535; and/or the like (i.e., collectively a component collection). These components may be stored and accessed from the storage devices and/or from storage devices accessible through an interface bus. Although non-conventional program components such as those in the component collection, typically, are stored in a local storage device 2514, they may also be loaded and/or stored in memory such as: peripheral devices, RAM, remote storage facilities through a communications network, ROM, various forms of memory, and/or the like.

Operating System

The operating system component 2515 is an executable program component facilitating the operation of the LCSN controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the LCSN controller to communicate with other entities through a communications network 2513. Various communication protocols may be used by the LCSN controller as a subcarrier transport mechanism for interaction, such as, but not limited to: multicast, TCP/IP, UDP, unicast, and/or the like.

Information Server

An information server component 2516 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C # and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the LCSN controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the LCSN database 2519, operating systems, other program components, user interfaces, Web browsers, and/or the like.

Access to the LCSN database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the LCSN. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the LCSN as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 2517 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 2518 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., Firefox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the LCSN enabled nodes. The combined application may be nugatory on systems employing standard Web browsers.

Mail Server

A mail server component 2521 is a stored program component that is executed by a CPU 2503. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C # and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the LCSN.

Access to the LCSN mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 2522 is a stored program component that is executed by a CPU 2503. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 2520 is a stored program component that is executed by a CPU 2503, crypto-graphic processor 2526, cryptographic processor interface 2527, cryptographic processor device 2528, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the LCSN may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the LCSN component to engage in secure transactions if so desired. The cryptographic component facilitates the secure accessing of resources on the LCSN and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The LCSN Database

The LCSN database component 2519 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the LCSN database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the LCSN database is implemented as a data-structure, the use of the LCSN database 2519 may be integrated into another component such as the LCSN component 2535. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 2519 includes several tables 2519a-h.

A user profile table 2519a includes fields such as, but not limited to: a user_id, user_screenname, user_first_name, user_last_name, user_age, user_birthday, user_occupation, user_address, user_financial_data, user_matches, user_favorites, user_joined, user_location, and/or the like. The user table may support and/or track user data on a LCSN. A personality profile table 2519b includes fields such as, but not limited to: a personality_id, user_id, personality_hobby, personality_habit, personality_misc_keywords, personality_type, and/or the like. The user table may support and/or track user personality data on a LCSN. A mobile devices table 2519 includes fields such as, but not limited to: a device_id, user_id, device_IP, device_MAC, device_name, device_model, device_serial, device_bluetooth, device_wireless, device_cell_network, device_GPS, device_updated_date, and/or the like. The user table may support and/or track information about users' mobile devices on a LCSN. A survey results table 2519d includes fields such as, but not limited to: a results_id, user_id, survey_id, results_responses, and/or the like. The user table may support and/or track user responses to surveys on a LCSN. A scores table 2519e includes fields such as, but not limited to: a score_id, user_id, match_id, score_value, and/or the like. The user table may support and/or track user scores for matches on a LCSN. A messages table 2519f includes fields such as, but not limited to: a message_id, user_id, recipient_id, message_content, message_attachment, message_date, and/or the like. The user table may support and/or track message data on a LCSN. A transactions table 2519g includes fields such as, but not limited to: a transaction_id, user_id, merchant_id, transaction_date, transaction_value, transaction_method, and/or the like. The user table may support and/or track financial transactions on a LCSN. A merchants table 2519h includes fields such as, but not limited to: a merchant_id, merchant_name, merchant_address, merchant_website, merchant_deals, and/or the like. The user table may support and/or track merchant data on a LCSN. In one embodiment, the LCSN database may interact with other database systems. For example, employing a distributed database system, queries and data access by search LCSN component may treat the combination of the LCSN database, an integrated data security layer database as a single database entity.

In one embodiment, user programs may contain various user interface primitives, which may serve to update the LCSN. Also, various accounts may require custom database tables depending upon the environments and the types of clients the LCSN may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 2519a-h. The LCSN may be configured to keep track of various settings, inputs, and parameters via database controllers.

The LCSN database may communicate to and/or with other components in a component collection, including itself, and/or facilities of the like. Most frequently, the LCSN database communicates with the LCSN component, other program components, and/or the like. The database may contain, retain, and provide information regarding other nodes and data.

The LCSNs

The LCSN component 2535 is a stored program component that is executed by a CPU. In one embodiment, the LCSN component incorporates any and/or all combinations of the aspects of the LCSN that was discussed in the previous figures. As such, the LCSN affects accessing, obtaining and the provision of information, services, transactions, and/or the like across various communications networks.

The LCSN transforms user biographical information and location inputs via LCSN components 2541-2547 into location-conscious match and advertisement outputs.

The LCSN component enabling access of information between nodes may be developed by employing standard development tools and languages such as, but not limited to: Apache components, Assembly, ActiveX, binary executables, (ANSI) (Objective-) C (++), C # and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the LCSN server employs a cryptographic server to encrypt and decrypt communications. The LCSN component may communicate to and/or with other components in a component collection, including itself, and/or facilities of the like. Most frequently, the LCSN component communicates with the LCSN database, operating systems, other program components, and/or the like. The LCSN may contain, communicate, generate, obtain, and/or provide program component, system, user, and/or data communications, requests, and/or responses.

Distributed LCSNs

The structure and/or operation of any of the LCSN node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the LCSN controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c -post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the LCSN controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address='192.168.0.100';
$port=255;
// create a server-side SSL socket, listen for/accept incoming communication
$sock=socket_create(AF_INET, SOCK_STREAM, 0);
socket_bind($sock, $address, $port) or die('Could not bind to address');
socket_listen($sock);
$client=socket_accept($sock);
// read input data from client device in 1024 byte blocks until end of message
do {
   $input=
   $input=socket_read($client, 1024);
   $data.=$input;
} while($input !=" "):
//parse data to extract variables
$obj=json_decode($data, true);
// store input data in a database
mysql_connect("201.408.185.132",$DBserver,$password);
// access database server
```

```
mysql_select("CLIENT_DB.SQL"); // select database to
append
mysql_query("INSERT INTO UserTable (transmission)
VALUES ($data)"); // add data to UserTable table in a
CLIENT database
mysql_close("CLIENT_DB.SQL"); // close connection to
database
?>
```

Also, the following resources may be used to provide example embodiments regarding SOAP parser implementation:
http://www.xav.com/perl/site/lib/SOAP/Parser.html
http://publib.boulder.ibm.com/infocenter/tivihelp/v2rl/index.jsp?topic=/com.ibm.IBMDI.doc/referenceguide295.htm
and other parser implementations:
http://publib.boulder.ibm.com/infocenter/tivihelp/v2rl/index.jsp?topic=/com.ibm.IBMDI.doc/referenceguide259.htm
all of which are hereby expressly incorporated by reference.

In order to address various issues and advance the art, the entirety of this application for LOCATION-CONSCIOUS SOCIAL NETWORKING APPARATUSES, METHODS, AND SYSTEMS (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others.

In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a LCSN individual and/or enterprise user, database configuration and/or relational model, data type, data transmission and/or network framework, syntax structure, and/or the like, various embodiments of the LCSN, may be implemented that enable a great deal of flexibility and customization. For example, aspects of the LCSN may be adapted for dating applications, conference networking applications, location-dependent social networking applications, and/or the like. While various embodiments and discussions of the LCSN have included dating applications, however, it is to be understood that the embodiments described herein may be readily configured and/or customized for a wide variety of other applications and/or implementations.

What is claimed is:

1. A processor-implemented method for location-conscious social networking, comprising:
    collecting via a processor personality details pertaining to a user;
    analyzing the personality detailed via the processor and generating at least one personality keyword associated with the user's personality;
    constructing via the processor a personality profile for the user based on the at least one generated personality keyword;
    collecting via the processor geolocation information regarding the user;
    comparing the geolocation regarding the user with geolocation data associated with at least one other user;
    calculating a compatibility rating for the user and the at least one other user based on the personality profile for the user and at least one personality profile associated with the at least one other user;
    sending an alert to the user and the at least one other user if (a) the geolocation data regarding the user and the geolocation data associated with the at least one other user indicate that the user and the at least one other user are within a specified distance of one another and (b) the user and the at least one other user share compatible trait parameters;
    receiving an anonymous indication of interest from the user in regards to the at least one other user;
    storing the anonymous indication of interest;
    sending a notification of interest to the user and the at least one other user if the at least other user has also indicated interest in the user; and
    forwarding messages sent from the user to the at least one other user, and from the at least one other user to the user, if the at least one other user has also indicated interest in the user.

2. The method of claim 1, wherein the compatible trait parameters include any of: a hobby, a habit, business objectives, sexuality, sex, gender, occupation, interests, education level, height, eye color, hair color, age, fitness level, and personality type.

3. The method of claim 1, wherein the personality details are analyzed via a natural language processing component.

4. The method of claim 1, wherein the geolocation data is GPS data.

5. The method of claim 1, wherein the geolocation data is based on Wi-Fi network data.

6. The method of claim 1, wherein the geolocation data is based on mobile phone network data.

7. The method of claim 1, wherein the alert includes profile information associated with the at least one other user.

8. The method of claim 1, wherein the geolocation data is based on using any of GPS, Wi-Fi, Bluetooth, or mobile phone network data utilized with an image processing component.

9. The method of claim 1, wherein the geolocation data is based solely on an image processing component.

10. An apparatus for location-conscious social networking, comprising:
    a processor; and
    a memory in communication with the processor possessing processor-readable instructions to:
        collect via a processor personality details pertaining to a user;
        analyze the personality details via the processor and generating at least one personality keyword associated with the user's personality;
        construct via the processor a personality profile for the user based on the at least one generated personality keyword;
        collect via the processor geolocation information regarding the user;
        compare the geolocation regarding the user with geolocation data associated with at least one other user;
        calculate a compatibility rating for the user and the at least one other user based on the personality profile for the user and at least one personality profile associated with the at least one other user;
        send an alert to the user and the at least one other user if (a) the geolocation data regarding the user and the geolocation data associated with the at least one other user indicate that the user and the at least one other user are within a specified distance of one another and (b) the user and the at least one other user share compatible trait parameters;
        receive an anonymous indication of interest from the user in regards to the at least one other user;
        store the anonymous indication of interest;
        send a notification of interest to the user and the at least one other user if the at least other user has also indicated interest in the user; and
        forward messages sent from the user to the at least one other user, and from the at least one other user to the user, if the at least one other user has also indicated interest in the user.

11. The apparatus of claim 10, wherein the compatible trait parameters include any of: a hobby, a habit, business objectives, sexuality, sex, gender, occupation, interests, education level, height, eye color, hair color, age, fitness level, and personality type.

12. The apparatus of claim 10, wherein the personality details are analyzed via a natural language processing component.

13. The apparatus of claim 10, wherein the geolocation data is GPS data.

14. The apparatus of claim 10, wherein the geolocation data is based on Wi-Fi network data.

15. The apparatus of claim 10, wherein the geolocation data is based on mobile phone network data.

16. The apparatus of claim 10, wherein the alert profile information associated with the at least one other user.

17. A system for location-conscious social networking, comprising:
    means to collect via a processor personality details pertaining to user;
    means to analyze the personality details via the processor and generating at least one personality keyword associated with the user's personality;
    means to construct via the processor a personality profile for the user based on the at least one generated personality keyword;
    means to collect via the processor geolocation information regarding the user;
    means to compare the geolocation regarding the user with geolocation data associated with at least one other user;
    means to calculate a compatibility rating for the user and the at least one other user based on the personality profile for the user and at least one personality profile associated with the at least one other user;
    means to send an alert to the user and the at least one other user if (a) the geolocation data regarding the user and the geolocation data associated with the at least one other user indicate that the user and the at least one other user are within a specified distance of one another and (b) the user and the at least one other user share compatible trait parameters;
    means for receiving an anonymous indication of interest from the user in regards to the at least one other user;
    means for storing the anonymous indication of interest;
    means for sending a notification of interest to the user and the at least one other user if the at least other user has also indicated interest in the user; and
    means for forwarding messages sent from the user to the at least one other user, and from the at least one other user to the user, if the at least one other user has also indicated interest in the user.

18. The system of claim 17, wherein the compatible trait parameters include any of: a hobby, a habit, business objectives, sexuality, sex, gender, occupation, interests, education level, height, eye color, hair color, age, fitness level, and personality type.

19. The system of claim 17, wherein the personality details are analyzed via a natural language processing component.

20. The system of claim 17, wherein the geolocation data is GPS data.

21. The system of claim 17, wherein the geolocation data is based on Wi-Fi network data.

22. The system of claim 17, wherein the geolocation data is based on mobile phone network data.

23. The system of claim 17, wherein the alert includes profile information associated with the at least one other user.

* * * * *